(12) United States Patent
Newmark et al.

(10) Patent No.: US 11,948,742 B2
(45) Date of Patent: *Apr. 2, 2024

(54) SYSTEMS AND METHODS FOR ENHANCING ELECTRICAL ENERGY STORAGE

(71) Applicant: ClearWater Holdings, Ltd., Carson City, NV (US)

(72) Inventors: G. Noah Newmark, Marina Del Rey, CA (US); Stephen M. Collins, Los Angeles, CA (US)

(73) Assignee: ClearWater Holdings Ltd., Carson City, NV (US)

( * ) Notice: Subject to any disclaimer, the term of this patent is extended or adjusted under 35 U.S.C. 154(b) by 92 days.

This patent is subject to a terminal disclaimer.

(21) Appl. No.: 17/512,355

(22) Filed: Oct. 27, 2021

(65) Prior Publication Data

US 2022/0051856 A1 Feb. 17, 2022

Related U.S. Application Data

(63) Continuation of application No. 16/644,466, filed as application No. PCT/US2018/048868 on Aug. 30, 2018, now Pat. No. 11,189,434.

(Continued)

(51) Int. Cl.
*H01G 11/78* (2013.01)
*H01G 11/08* (2013.01)
(Continued)

(52) U.S. Cl.
CPC ............ *H01G 11/78* (2013.01); *H01G 11/08* (2013.01); *H01G 11/52* (2013.01); *H01G 11/58* (2013.01);
(Continued)

(58) Field of Classification Search
None
See application file for complete search history.

(56) References Cited

U.S. PATENT DOCUMENTS

| 3,435,267 A | 3/1969 | Beyersdorf | |
| 3,597,278 A * | 8/1971 | Von Brimer | H01M 10/00 |
| | | | 429/10 |

(Continued)

FOREIGN PATENT DOCUMENTS

| CN | 1408121 A | 4/2003 |
| CN | 1536687 A | 10/2004 |

(Continued)

OTHER PUBLICATIONS

International Search Report in International Application No. PCT/US2018/048868, dated Dec. 14, 2018 (19 pages).

(Continued)

*Primary Examiner* — Dion R. Ferguson
(74) *Attorney, Agent, or Firm* — Nixon Peabody LLP

(57) ABSTRACT

An electrical energy storage device comprises a housing having a first end, a second end, a first side, and a second side; a first electrode disposed in the housing adjacent the first side; a second electrode disposed in the housing adjacent the second side; and an electrolyte mixture disposed between the first electrode and the second electrode, the electrolyte mixture containing a plurality of ions. In an implementation, a channel disposed in the housing permits ions to flow adjacent to the first end and a barrier in the housing prevents ions from flowing adjacent to the second end. In another implementation, some of the ions are magnetic. In a further implementation, some of the ions have a greater density than other ions. Charging of the electrical (Continued)

energy storage device is enhanced by applying a magnetic field to the electrical energy storage device or rotating the device.

28 Claims, 10 Drawing Sheets

Related U.S. Application Data

(60) Provisional application No. 62/556,001, filed on Sep. 8, 2017.

(51) Int. Cl.
- *H01G 11/52* (2013.01)
- *H01G 11/58* (2013.01)
- *H02K 1/278* (2022.01)
- *H02K 1/2791* (2022.01)
- *H02K 1/2795* (2022.01)

(52) U.S. Cl.
CPC ........... *H02K 1/278* (2013.01); *H02K 1/2791* (2022.01); *H02K 1/2795* (2022.01)

(56) References Cited

U.S. PATENT DOCUMENTS

| | | | |
|---|---|---|---|
| 4,048,391 A * | 9/1977 | Tilley | H01M 10/39 429/104 |
| 4,087,698 A | 5/1978 | Myers | |
| 4,185,366 A | 1/1980 | Gilbert | |
| 4,286,198 A | 8/1981 | de Valroger | |
| 4,340,830 A | 7/1982 | Ellefsen | |
| 4,370,577 A | 1/1983 | Wakabayashi | |
| 4,388,381 A * | 6/1983 | Mennicke | H01M 10/3909 429/104 |
| 4,441,043 A | 4/1984 | DeCesare | |
| 4,458,228 A | 7/1984 | Baumgartner | |
| 4,521,497 A | 6/1985 | Tamminen | |
| 4,542,323 A | 9/1985 | Doemen | |
| 4,563,602 A | 1/1986 | Nagasaka | |
| 4,568,862 A | 2/1986 | Tassinario | |
| 4,626,751 A | 12/1986 | Doemen | |
| 4,802,690 A | 2/1989 | Raidel | |
| 4,806,832 A | 2/1989 | Muller | |
| 4,882,115 A * | 11/1989 | Schmickl | H01G 9/08 29/25.03 |
| 4,924,156 A | 5/1990 | Muller | |
| 4,973,869 A | 11/1990 | Cho | |
| 5,038,083 A | 8/1991 | Muller | |
| 5,051,641 A | 9/1991 | Weh | |
| 5,117,142 A | 5/1992 | von Zweygbergk | |
| 5,128,570 A | 7/1992 | Isozaki | |
| 5,130,583 A | 7/1992 | Andoh | |
| 5,134,682 A | 7/1992 | Muller | |
| 5,142,181 A | 8/1992 | Newell | |
| 5,289,072 A | 2/1994 | Lange | |
| 5,474,799 A | 12/1995 | Thigpen | |
| 5,543,674 A | 8/1996 | Koehler | |
| 5,708,310 A | 1/1998 | Sakamoto | |
| 5,777,418 A | 7/1998 | Lange | |
| 5,838,079 A | 11/1998 | Morohashi | |
| 5,894,902 A | 4/1999 | Cho | |
| 5,942,828 A | 8/1999 | Hill | |
| 5,952,743 A | 9/1999 | Sidey | |
| 5,973,436 A | 10/1999 | Mitcham | |
| 5,977,684 A | 11/1999 | Lin | |
| 6,011,339 A | 1/2000 | Kawakami | |
| 6,043,579 A | 3/2000 | Hill | |
| 6,222,287 B1 | 4/2001 | Suzuki | |
| 6,228,220 B1 | 5/2001 | Hada | |
| 6,228,235 B1 | 5/2001 | Tepman | |
| 6,414,408 B1 | 7/2002 | Erdman | |
| 6,449,139 B1 | 9/2002 | Farahmandi | |
| 6,492,758 B1 | 12/2002 | Gianni | |
| 6,556,424 B2 * | 4/2003 | O'Brien | H01G 11/02 361/517 |
| 6,700,267 B2 | 3/2004 | Weiss | |
| 6,710,581 B1 | 3/2004 | Lee | |
| 6,729,140 B2 | 5/2004 | Care | |
| 6,741,010 B2 | 5/2004 | Wilkin | |
| 6,798,089 B1 | 9/2004 | Smit | |
| 6,803,691 B2 | 10/2004 | Rose | |
| 6,847,135 B2 | 1/2005 | Kastinger | |
| 6,870,284 B2 | 3/2005 | Uchida | |
| 6,888,272 B2 | 5/2005 | Kastinger | |
| 6,891,306 B1 | 5/2005 | Soghomonian | |
| 6,924,574 B2 | 8/2005 | Qu | |
| 6,952,068 B2 | 10/2005 | Gieras | |
| 7,030,529 B2 | 4/2006 | Dommsch | |
| 7,067,942 B2 | 6/2006 | Korenaga | |
| 7,124,495 B2 | 10/2006 | Gieras | |
| 7,164,220 B2 | 1/2007 | Gilmour | |
| 7,466,058 B2 | 12/2008 | Dubois | |
| 7,492,074 B1 | 2/2009 | Rittenhouse | |
| 7,579,742 B1 | 8/2009 | Rittenhouse | |
| 7,633,198 B2 | 12/2009 | Kirkman | |
| 7,652,406 B2 | 1/2010 | Kim | |
| 7,688,036 B2 | 3/2010 | Yarger | |
| 7,701,678 B2 | 4/2010 | Dooley | |
| 7,755,244 B2 | 7/2010 | Ley | |
| 7,777,381 B2 | 8/2010 | Takeuchi | |
| 7,791,242 B2 * | 9/2010 | Bojiuc | H02K 99/00 310/266 |
| 7,791,245 B1 | 9/2010 | Hao | |
| 7,812,500 B1 | 10/2010 | Ham | |
| 7,884,563 B2 | 2/2011 | Takeuchi | |
| 7,906,885 B2 | 3/2011 | Lu | |
| 7,944,107 B2 | 5/2011 | Thoms | |
| 7,944,112 B2 | 5/2011 | Kim | |
| 7,960,893 B2 | 6/2011 | Kim | |
| 7,986,069 B2 | 7/2011 | Takeuchi | |
| 7,990,019 B2 | 8/2011 | Sung | |
| 8,053,946 B2 | 11/2011 | Koizumi | |
| 8,058,763 B2 | 11/2011 | Clark | |
| 8,074,922 B2 | 12/2011 | Bojiuc | |
| 8,084,879 B2 | 12/2011 | Stiesdal | |
| 8,089,175 B2 | 1/2012 | Stiesdal | |
| 8,106,563 B2 | 1/2012 | Ritchey | |
| 8,110,961 B2 | 2/2012 | Hsu | |
| 8,115,361 B2 | 2/2012 | Iki | |
| 8,154,146 B2 | 4/2012 | Fischer | |
| 8,159,104 B1 | 4/2012 | Bojiuc | |
| 8,169,109 B2 | 5/2012 | Sykes | |
| 8,188,633 B2 | 5/2012 | Quere | |
| 8,207,644 B2 | 6/2012 | Himmelmann | |
| 8,207,648 B2 | 6/2012 | Li | |
| 8,212,445 B2 | 7/2012 | Ritchey | |
| 8,232,695 B2 | 7/2012 | Bojiuc | |
| 8,258,782 B2 | 9/2012 | Kaita | |
| 8,264,120 B2 | 9/2012 | Hsu | |
| 8,274,191 B2 | 9/2012 | Stiesdal | |
| 8,278,872 B2 | 10/2012 | Li | |
| 8,283,813 B2 | 10/2012 | Gilchrist | |
| 8,288,916 B2 | 10/2012 | Quere | |
| 8,294,322 B2 | 10/2012 | Aiki | |
| 8,299,676 B2 | 10/2012 | Miyata | |
| 8,330,404 B2 | 12/2012 | Sakai | |
| 8,334,634 B2 | 12/2012 | Palmer | |
| 8,339,009 B2 | 12/2012 | Mueller | |
| 8,344,567 B2 | 1/2013 | Kamiki | |
| 8,350,442 B2 | 1/2013 | Akutsu | |
| 8,354,768 B2 | 1/2013 | Cipriani | |
| 8,358,046 B2 * | 1/2013 | Platon | H02K 16/04 310/112 |
| 8,373,319 B1 | 2/2013 | Barnes | |
| 8,381,389 B2 | 2/2013 | Lisi | |
| 8,390,168 B2 | 3/2013 | Hsu | |
| 8,432,081 B2 | 4/2013 | Wang | |
| 8,436,507 B2 | 5/2013 | Chien | |
| 8,482,171 B2 | 7/2013 | Edwards | |
| 8,536,751 B2 | 9/2013 | Cipriani | |
| 8,536,758 B2 | 9/2013 | Lisi | |

(56) References Cited

U.S. PATENT DOCUMENTS

| | | | |
|---|---|---|---|
| 8,546,988 B2 | 10/2013 | Bright | |
| 8,890,389 B2 | 11/2014 | Li | |
| 9,162,638 B2 | 10/2015 | Inoue | |
| 9,184,647 B2 | 11/2015 | Rapoport | |
| 9,218,917 B2 * | 12/2015 | Brambilla | B82Y 30/00 |
| 9,633,798 B2 * | 4/2017 | Curran | H01G 11/28 |
| 10,217,570 B2 * | 2/2019 | Matsuura | H01M 10/0413 |
| 10,515,768 B2 | 12/2019 | Ryhanen | |
| 10,886,074 B2 * | 1/2021 | Brambilla | H01G 11/48 |
| 11,189,434 B2 * | 11/2021 | Newmark | H02K 1/2795 |
| 2002/0118505 A1 * | 8/2002 | O'Brien | H01G 11/78 |
| | | | 361/502 |
| 2002/0130655 A1 | 9/2002 | Okada | |
| 2003/0011455 A1 | 1/2003 | Wakuda | |
| 2003/0025417 A1 | 2/2003 | Rose | |
| 2003/0030969 A1 * | 2/2003 | Farahmandi | H01G 11/72 |
| | | | 361/502 |
| 2003/0102770 A1 | 6/2003 | Laskaris | |
| 2003/0127917 A1 | 7/2003 | Kang | |
| 2003/0230946 A1 | 12/2003 | Durham | |
| 2004/0061397 A1 | 4/2004 | Rose | |
| 2004/0155548 A1 | 8/2004 | Rasmussen | |
| 2004/0239199 A1 | 12/2004 | Qu | |
| 2004/0251759 A1 | 12/2004 | Hirzel | |
| 2005/0104456 A1 | 5/2005 | Yajima | |
| 2005/0179336 A1 | 8/2005 | Hasebe | |
| 2006/0022544 A1 | 2/2006 | Kinashi | |
| 2006/0038456 A1 | 2/2006 | Bojiuc | |
| 2006/0043821 A1 | 3/2006 | Kojima | |
| 2006/0192453 A1 | 8/2006 | Gieras | |
| 2007/0216249 A1 | 9/2007 | Gruendel | |
| 2007/0228860 A1 | 10/2007 | Rao | |
| 2007/0247017 A1 | 10/2007 | Bumby | |
| 2007/0267929 A1 | 11/2007 | Pulnikov | |
| 2007/0290175 A1 | 12/2007 | Kim | |
| 2008/0048505 A1 | 2/2008 | Moriyama | |
| 2008/0050266 A1 | 2/2008 | Chen | |
| 2008/0122311 A1 | 5/2008 | Werst | |
| 2008/0136272 A1 | 6/2008 | Ishikawa | |
| 2008/0211326 A1 | 9/2008 | Kang | |
| 2008/0246346 A1 * | 10/2008 | Harris | H02K 35/02 |
| | | | 310/12.25 |
| 2008/0246362 A1 | 10/2008 | Hirzel | |
| 2008/0278020 A1 | 11/2008 | Ley | |
| 2009/0026869 A1 | 1/2009 | Kaehler | |
| 2009/0102305 A1 | 4/2009 | Lu | |
| 2009/0108712 A1 | 4/2009 | Holtzapple | |
| 2009/0224628 A1 | 9/2009 | Hiwaki | |
| 2009/0243413 A1 | 10/2009 | Gilchrist | |
| 2010/0058817 A1 | 3/2010 | Yoshikawa | |
| 2010/0060393 A1 * | 3/2010 | Joo | H01H 33/38 |
| | | | 335/180 |
| 2010/0101879 A1 | 4/2010 | McVickers | |
| 2010/0307913 A1 | 12/2010 | Ma | |
| 2010/0327787 A1 | 12/2010 | Sakai | |
| 2011/0058967 A1 | 3/2011 | Arita | |
| 2011/0109190 A1 | 5/2011 | Aoyama | |
| 2011/0234033 A1 | 9/2011 | Filatov | |
| 2012/0126614 A1 | 5/2012 | Inoue | |
| 2012/0228977 A1 | 9/2012 | Petro | |
| 2012/0262127 A1 * | 10/2012 | Feaver | H01G 11/58 |
| | | | 977/773 |
| 2012/0299405 A1 | 11/2012 | Li | |
| 2012/0299430 A1 | 11/2012 | Pennander | |
| 2012/0306212 A1 | 12/2012 | Munoz | |
| 2013/0164647 A1 | 6/2013 | Kobayashi | |
| 2013/0270955 A1 | 10/2013 | Lillington | |
| 2014/0049878 A1 * | 2/2014 | Tamachi | H01G 11/82 |
| | | | 361/502 |
| 2014/0191612 A1 | 7/2014 | Mariotto | |
| 2014/0375164 A1 * | 12/2014 | Deak | H02K 7/183 |
| | | | 310/156.43 |
| 2016/0276649 A1 | 9/2016 | Turney | |
| 2017/0117101 A1 | 4/2017 | Matsuura | |
| 2021/0065995 A1 * | 3/2021 | Newmark | H01G 11/52 |

FOREIGN PATENT DOCUMENTS

| | | |
|---|---|---|
| CN | 101479913 A | 7/2009 |
| CN | 102470812 A | 5/2012 |
| CN | 202395533 U | 8/2012 |
| CN | 103098281 A | 5/2013 |
| CN | 104364862 A | 2/2015 |
| CN | 106233579 A | 12/2016 |
| DE | 3142913 A1 | 5/1983 |
| DE | 10037787 A1 | 3/2002 |
| EP | 2495853 A1 | 9/2012 |
| EP | 2168225 A4 | 6/2015 |
| IN | 201627027705 A | 10/2016 |
| JP | S48-6323 A | 1/1973 |
| JP | S49-34082 | 9/1974 |
| JP | S54-141307 | 10/1979 |
| JP | S55-160964 | 12/1980 |
| JP | H0366553 | 6/1991 |
| JP | H04359656 A | 12/1992 |
| JP | 1994005380 | 1/1994 |
| JP | 2000134902 | 5/2000 |
| JP | 2001211623 A | 8/2001 |
| JP | 2003-525522 | 8/2003 |
| JP | 2004129339 | 4/2004 |
| JP | 2005287103 A | 10/2005 |
| JP | 2006280066 A | 10/2006 |
| JP | 2009505619 | 2/2009 |
| JP | 2009136046 | 6/2009 |
| JP | 2010166741 | 7/2010 |
| JP | WO2008126408 | 7/2010 |
| JP | 2012075318 | 4/2012 |
| JP | WO2012007984 | 9/2013 |
| JP | 5117813 B2 | 1/2016 |
| JP | 2017-079301 | 4/2017 |
| KR | 16-130755 | 11/2016 |
| RU | 2 131 637 | 6/1999 |
| RU | 2310966 | 11/2007 |
| RU | 2393621 | 6/2010 |
| TW | 200919903 S | 5/2009 |
| TW | 201444231 A | 11/2014 |
| TW | 201618438 | 5/2016 |
| WO | WO 91/07805 | 5/1991 |
| WO | WO 93/15547 A1 | 8/1993 |
| WO | WO 00/54396 | 9/2000 |
| WO | WO 03/065554 A1 | 8/2003 |
| WO | WO 03/094328 A1 | 11/2003 |
| WO | WO 2006/117210 A1 | 11/2006 |
| WO | WO 2007/000054 A1 | 1/2007 |
| WO | WO 2009/009075 A1 | 1/2009 |
| WO | WO 2009/070333 A1 | 6/2009 |
| WO | WO-2011025918 A1 * | 3/2011 ............... B60K 1/02 |
| WO | WO 2015/120093 A1 | 8/2015 |
| WO | WO 2016/014717 A1 | 1/2016 |
| WO | WO 2016/178943 A1 | 11/2016 |

OTHER PUBLICATIONS

Extended European Search Report in European Patent Application No. EP 188542716, dated Apr. 28, 2021 (10 pages).

Notice of Grounds for Rejection in Japanese Patent Application No. JP 2020-514222, dated Nov. 4, 2021 (8 pages w/English translation).

* cited by examiner

SYSTEMS AND METHODS FOR ENHANCING ELECTRICAL ENERGY STORAGE

CROSS-REFERENCE TO RELATED APPLICATION

This application is a continuation of U.S. patent application Ser. No. 16/644,466, filed Mar. 4, 2020, now allowed, which is a U.S. National Stage of International Application No. PCT/US2018/048868, filed Aug. 30, 2018, which claims priority to and the benefit of U.S. Provisional Patent Application No. 62/556,001, filed Sep. 8, 2017, each of which is hereby incorporated by reference herein in its entirety.

TECHNICAL FIELD

The present disclosure relates to electrical energy storage, more specifically, the present disclosure relates to the use of electrical energy storage devices in conjunction with rotating or linear machines, as well as with electromagnetic motors and generators.

BACKGROUND

Current electrical energy storage devices and methods have operational constraints limiting their utility in a variety of applications. The limitations can be traced to design, manufacturing processes and other physical constraints. New devices and methods for using those devices are needed that can improve the functional utility of electrical energy storage for applications with increasing demand, such as battery- and hybrid-electric vehicles, nano- and micro-grids, and the bulk electric power system.

The present disclosure is directed to minimizing these constraints and introducing expanded functionality, as well as solving other problems.

SUMMARY

According to some aspects of the present disclosure, an electrical energy storage device comprises a housing having a first end portion, a second opposing end portion, a first side portion, and a second opposing side portion; a first electrode disposed in the housing adjacent to the first side portion; a second electrode disposed in the housing adjacent to the second opposing side portion; an electrolyte mixture disposed in the housing and generally between the first electrode and the second electrode, the electrolyte mixture containing a plurality of ions; a channel defined generally between the first electrode and the second electrode, the channel being configured to permit at least a portion of the plurality of ions to flow from a first portion of the channel generally adjacent to the first electrode, through a second portion of the channel generally adjacent to the first end portion of the housing, and to a third portion of the channel generally adjacent to the second electrode; and a barrier disposed generally between the first electrode and the second electrode, the barrier being configured to aid in preventing the plurality of ions from flowing adjacent to the second end portion of the housing.

According to some aspects of the present disclosure, an electromagnetic machine comprises an axle; a coil assembly coupled to the axle, the coil assembly including a core and a coil wrapped around the core; a first set of magnets coupled to the axle such that the first set of magnets is positioned adjacent to the coil assembly; and at least one electrical energy storage device disposed adjacent to the coil, the at least one electrical energy storage device including: a housing having a first end portion, a second opposing end portion, a first side portion, and a second opposing side portion; a first electrode disposed in the housing adjacent to the first side portion; a second electrode disposed in the housing adjacent to the second opposing side portion; an electrolyte mixture disposed in the housing and generally between the first electrode and the second electrode, the electrolyte mixture containing a plurality of ions; a channel defined generally between the first electrode and the second electrode, the channel being configured to permit at least a portion of the plurality of ions to flow from a first portion of the channel generally adjacent to the first electrode, through a second portion of the channel generally adjacent to the first end portion of the housing, and to a third portion of the channel generally adjacent to the second electrode; and a barrier disposed generally between the first electrode and the second electrode, the barrier being configured to aid in preventing the plurality of ions from flowing adjacent to the second end portion of the housing.

According to some aspects of the present disclosure, an electrical energy storage device comprises a housing having a first end portion, a second opposing end portion, a first side portion, and a second opposing side portion; a first electrode disposed in the housing adjacent to the first side portion; a second electrode disposed in the housing adjacent to the second opposing side portion; and an electrolyte mixture disposed in the housing and generally between the first electrode and the second electrode, the electrolyte mixture containing a plurality of magnetic ions and a plurality of non-magnetic ions. All of the magnetic ions generally have the same electric charge, and all of the non-magnetic ions generally have the same electric charge. The electric charge of the magnetic ions is generally opposite the electric charge of the non-magnetic ions.

According to some aspects of the present disclosure, an electromagnetic machine comprises an axle; a coil assembly mounted on the axle, the coil assembly including a core and a coil wrapped around the core; a set of magnets adjacent to the at least one coil assembly; and an electrical energy storage device disposed adjacent the set of magnets, the electrical energy storage device including: a housing having a first end portion, a second opposing end portion, a first side portion, and a second opposing side portion; a first electrode disposed in the housing adjacent to the first side portion; a second electrode disposed in the housing adjacent to the second opposing side portion; and an electrolyte mixture disposed in the housing and generally between the first electrode and the second electrode, the electrolyte mixture containing a plurality of magnetic ions and a plurality of non-magnetic ions. All of the magnetic ions generally have the same electric charge, and all of the non-magnetic ions generally have the same electric charge. The electric charge of the magnetic ions is generally opposite the electric charge of the non-magnetic ions.

According to some aspects of the present disclosure, an electrical energy storage device comprises a housing having a first end portion, a second opposing end portion, a first side portion, and a second opposing side portion; a first electrode disposed in the housing adjacent to the first side portion; a second electrode disposed in the housing adjacent to the second opposing side portion; an electrolyte mixture disposed in the housing between the first electrode and the second electrode, the electrolyte mixture containing a plurality of ions, the plurality of ions including a first type of ion having a first density and a second type of ion having a second density that is different from the first density. All of the first type of ion having the first density generally have the same electric charge, and all of the second type of ion having the second density generally have the same electric charge. The electric charge of the first type of ion is generally opposite the electric charge of the second type of ion.

According to some aspects of the present disclosure, an electromagnetic machine comprises an axle; a coil assembly mounted on the axle, the coil assembly including a core and a coil wrapped around the core; a set of magnets adjacent to the at least one coil assembly; and an electrical energy storage device disposed adjacent to the set of magnets, the electrical energy storage device including: a housing having a first end portion, a second opposing end portion, a first side portion, and a second opposing side portion; a first electrode disposed in the housing adjacent to the first side portion; a second electrode disposed in the housing adjacent to the second opposing side portion; and an electrolyte mixture disposed in the housing between the first electrode and the second electrode, the electrolyte mixture containing a plurality of ions, the plurality of ions including a first type of ion having a first density and a second type of ion having a second density that is different from the first density. All of the first type of ion having the first density generally have the same electric charge, and all of the second type of ion having the second density generally have the same electric charge. The electric charge of the first type of ion is generally opposite the electric charge of the second type of ion.

According to some aspects of the present disclosure, a method of charging an electrical energy storage device comprises positioning the electrical energy storage device adjacent to or within an electromagnetic machine, the electromagnetic machine including at least one set of magnets and at least one coil assembly; causing the electromagnetic machine to rotate such that (i) the at least one set of magnets is rotated relative to the at least one coil assembly, (ii) the at least one coil assembly is rotated relative to the at least one set of magnets, or (iii) both (i) and (ii); and responsive to the rotation of the at least one set of magnets or of the at least one coil assembly, generating electrical energy within the electrical energy storage device. In some aspects, rotation of the at least one set of magnets or of the at least one coil assembly generates a magnetic field, which can cause the electrical energy to be generated within the electrical energy storage device. In some aspects, rotation of the at least one set of magnets or of the at least one coil assembly causes rotation of the electrical energy storage device, and the rotation of the electrical energy storage device causes the electrical energy to be generated within the electrical energy storage device.

According to some aspects of the present disclosure, a method of charging an electrical energy storage device comprises applying a magnetic field to the electrical energy storage device; and responsive to the applying the magnetic field to the electrical energy storage device, storing an amount of electrical energy in the electrical energy storage device. In some aspects, the electrical energy storage device can be positioned within or adjacent to an electromagnetic machine. In some aspects, rotation of the electromagnetic machine can cause the magnetic field to be applied to the electrical energy storage device.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

Figure 1A:
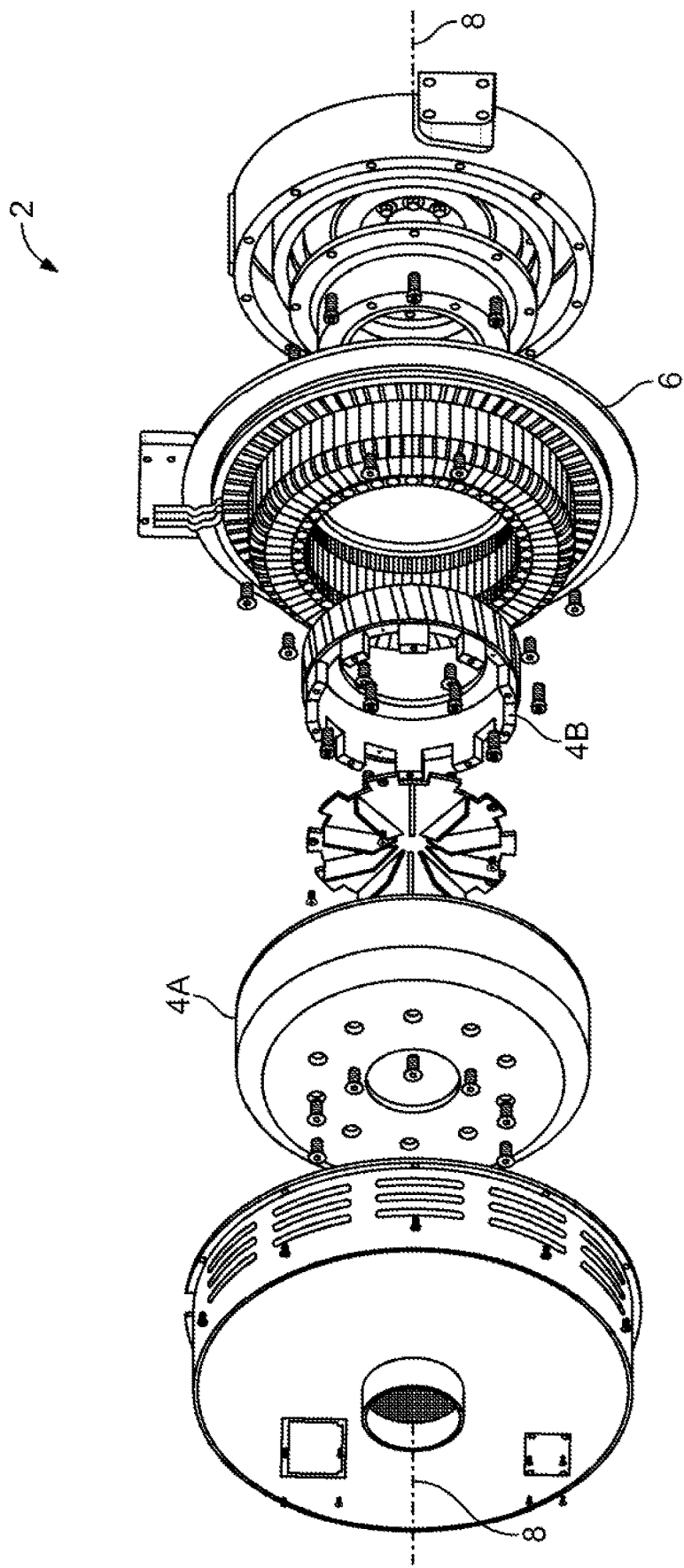
FIG. 1A is an exploded view of an exemplary electromagnetic machine, according to aspects of the present disclosure.

While the present disclosure is susceptible to various modifications and alternative forms, specific implementations and embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Referring now to FIG. 1A, an exploded view of an implementation of a rotating electromagnetic machine 2 according to aspects of the present disclosure is shown. Rotating electromagnetic machine 2 generally includes an outer magnet assembly 4A, an inner magnet assembly 4B, and a stator assembly 6. Outer magnet assembly 4A and inner magnet assembly 4B can each include one or more magnets that are configured to rotate about axis 8. The stator assembly 6 can have one or more coil assembles that include a coil wrapped around a core. The coil wrapped around the core can be composed of a single winding, or may be composed of multiple windings electrically connected together. The relative rotation between the magnets and the coil assemblies induces magnetic flux through the coil, which is utilized as part of the functionality of the rotating electromagnetic machine 2.

Figure 1B:
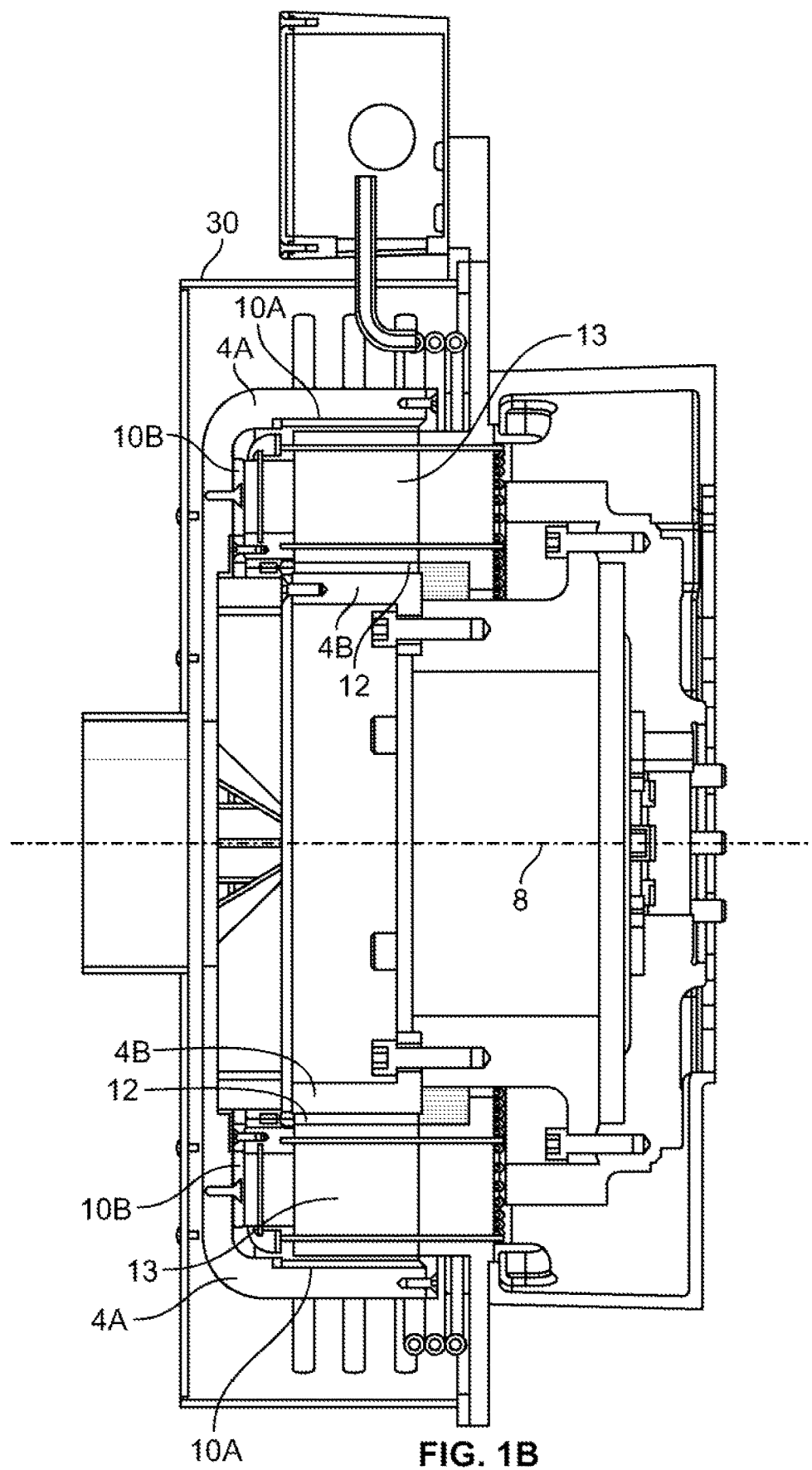
FIG. 1B is a cross-section of a collapsed view of the exemplary electromagnetic machine of FIG. 1A, according to aspects of the present disclosure.

FIG. 1B shows a cross-section of a collapsed view of the rotating electromagnetic machine of FIG. 1A. Shown are two sections of the outer magnet assembly 4A, each containing magnets 10A and 10B, while each section of the inner magnet assembly 4B contains magnet 12. As assembled, each set of magnets 10A, 10B, and 12 generally surround or encompass a coil assembly 13. In some implementations, the outer and inner magnet assemblies 4A, 4B are the rotor of the machine, and thus the magnets 10A, 10B, and 12 are configured to rotate about axis 8 relative to the coil assembly 13, which remains generally stationary. In this implementation, the coil assembly 13 is considered to be the stator of the machine. In other implementations, the coil assembly 13 is the rotor, and is thus configured to rotate about axis 8 relative to magnets 10A, 10B, and 12, which remain stationary. In this implementation, outer and inner magnet assemblies 4A, 4B are considered to be the stator of the machine. The rotating electromagnetic machine may have any suitable number of coil assemblies disposed about the axis of rotation 8, and thus any suitable number of accompanying magnet sets. While three magnets 10A, 10B, and 12 are shown, the electromagnetic machine of FIG. 1A and FIG. 1B may have any suitable number of magnets.

Figure 2:
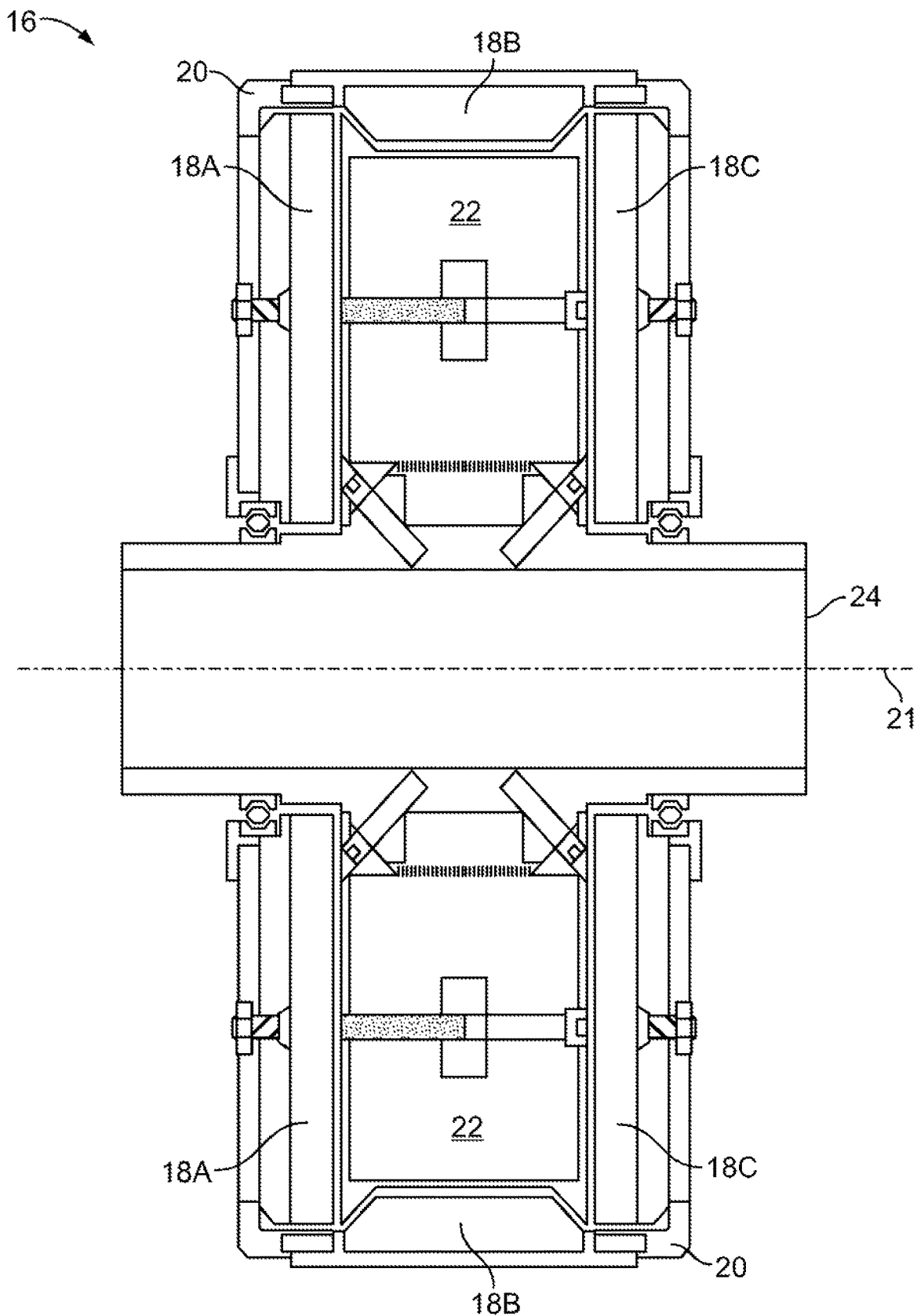
FIG. 2 is a cross-section of another exemplary electromagnetic machine, according to aspects of the present disclosure.

Referring now to FIG. 2, a cross-section of another implementation of a rotating electromagnetic machine 16 is shown. Rotating electromagnetic machine 16 includes magnets 18A, 18B, and 18C mounted in a magnet housing 20, and a coil assembly (not shown) mounted in a coil housing 22. In operation, the magnet housing 20 and magnets 18A, 18B, and 18C can be configured to rotate about axis 21 relative to the coil housing 22 while the coil housing 22 is fixedly coupled to a main axle 24. Alternatively, the coil housing 22 and the coil assembly can rotate about the axis 21 relative to magnets 18A, 18B, and 18C while the magnet housing 20 is fixedly coupled to the main axle 24. The cross-section of rotating electromagnetic machine 16 in FIG. 2 shows two coil housings 22 disposed about the axis of rotation 21, and thus two sets of magnets 18A, 18B, and 18C. However, any suitable number of coil housings and accompanying magnets may be disposed about the axis of rotation 21.

Generally, the rotating electromagnetic machines as discussed herein can be rotating electromagnetic generators, which convert rotational kinetic energy into electrical energy, magnetic energy, or both. Alternatively, the rotating electromagnetic machine can be a rotating electromagnetic motor, which converts electrical energy, magnetic energy, or both, into rotating kinetic energy.

Other electromagnetic machines can also be used according to aspects of the present disclosure herein. For example, the rotating electromagnetic machine of FIG. 1A and FIG. 1B can include a single magnet assembly that includes the magnets used as part of the machine, instead of outer magnet assembly 4A and inner magnet assembly 4B. The magnets may be configured as the rotor of the rotating electromagnetic machine, while the coil assemblies are configured as the stator of the rotating electromagnetic machine. Alternatively, the magnets may be configured as the stator of the rotating electromagnetic machine, while the coil assemblies are configured as the rotor of the rotating electromagnetic machine. Furthermore, one or both of the rotor or the stator of the rotating electromagnetic machine can comprise a combination of magnets and coil assemblies. Any rotating electromagnetic machine utilized as discussed herein may have any suitable number of magnets in a magnet set, such as one, two, three, four, five, or more magnets, and may have any suitable number of magnet sets.

Further, the electromagnetic machine as discussed herein may be a linear electromagnetic machine instead of a rotating electromagnetic machine. A linear electromagnetic generator can utilize one or more magnets to convert linear kinetic energy in electrical energy, magnetic energy, or both. A linear electromagnetic motor converts electrical energy, magnetic energy, or both into linear kinetic energy. The magnets may be configured as the rotor of the linear electromagnetic machine, while the coil assemblies are configured as the stator of the linear electromagnetic machine. Alternatively, the magnets may be configured as the stator of the linear electromagnetic machine, while the coil assemblies are configured as the rotor of the linear electromagnetic machine. Furthermore, one or both of the rotor or the stator of the linear electromagnetic machine can comprise a combination of magnets and coil assemblies. Any linear electromagnetic machine utilized as discussed herein may have any suitable number of magnets in a magnet set, such as one, two, three, four, five, or more magnets, and may have any suitable number of magnet sets. Other types of electromagnetic machines can also be used according to aspects of the present disclosure. Generally, any component of any of the machines described herein can be coupled to another component via one or more bearings to allow relative rotation between the components. For example, the stator of any electromagnetic machine (which could include a magnet housing containing magnets or a coil housing containing coils and the corresponding cores) can be coupled to an axle via one or more bearings, while the rotor (which could include a magnet housing containing magnets or a coil housing containing coils and the corresponding cores) be fixedly coupled to the axle. This allows the axle and the rotor to rotate relative the stator. In some implementations, the stator can be fixedly coupled to the axle while the rotor is coupled to the axle via one or more bearings.

Figure 3:
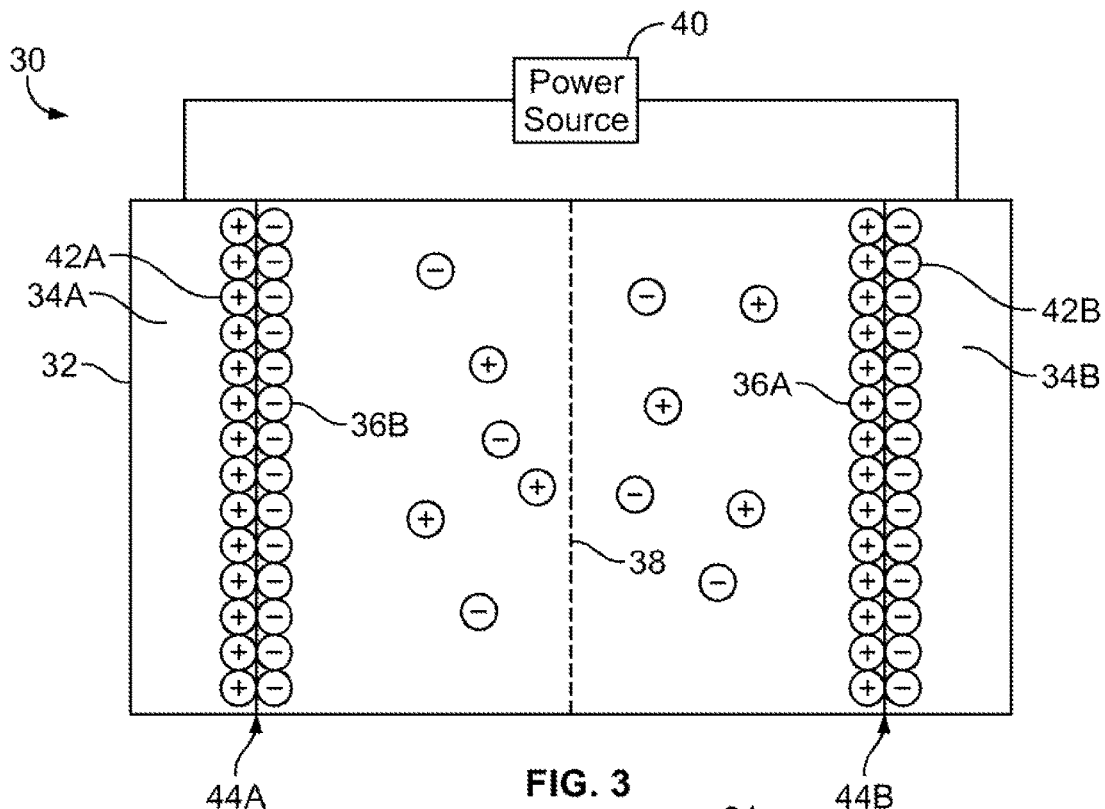
FIG. 3 is a cross-section of an electrical energy storage device, according to aspects of the present disclosure.

Referring now to FIG. 3, an electrical energy storage device 30 is shown. The type of electrical energy storage device 30 shown is generally known as an electric double layer capacitor. Electrical energy storage device 30 includes a housing 32, a first electrode 34A, and a second electrode 34B. First electrode 34A and second electrode 34B are generally parallel to each other and disposed on opposite sides of the housing 32. Either of the electrodes may act as a cathode or an anode. Disposed in the housing 32 is an electrolyte mixture that contains cations 36A and anions 36B in a solvent. Electrical energy storage device 30 can also include an ion-permeable separator 38 disposed between the first electrode 34A and the second electrode 34B. The ion-permeable separator 38 can be used to mechanically separate the first electrode 34A and the second electrode 34B, while allowing the cations 36A and anions 36B to flow throughout the interior of the housing 32. Electrical power can be applied to electrical energy storage device 30 via a power source 40. Power source 40 can be a voltage source, a current source, or any other appropriate source. The application of electrical power from power source 40 causes electrical energy to be stored in electrical energy storage device 30. References to storing electrical energy in electrical storage devices according to aspects of the present disclosure generally refer to the buildup and the storage of charges on the electrodes of the electrical energy storage devices. Moreover, references to the act of charging an electrical energy storage device generally refer to causing the electrical energy storage device to store energy in the form of accumulated charge, whether by applying an external power source or by another method.

In a standard capacitor, electrical energy is stored as an accumulation of charge on the electrodes of the capacitor. The electrodes are separated by a dielectric that does not permit current to flow. When electrical power from a power source is applied to the standard capacitor, positive charges accumulate on one electrode, while negative charges accumulate on the other electrode, which creates an electric field across the dielectric. The capacitance of the capacitor is a ratio of the charge that has accumulated on the electrodes to the voltage applied across the electrodes. The capacitance in a parallel plate capacitor is also generally proportional to the distance between the electrodes.

In an electric double layer capacitor such as electrical energy storage device 30, the application of electrical power from power source 40 causes positive charges 42A to accumulate on first electrode 34A, and negative charges 42B to accumulate on second electrode 34B. Because the cations 36A and anions 36B in the electrolyte mixture are free to flow throughout the housing 32 (and are not stationary as in the dielectric of an ordinary capacitor), the positive charges 42A on the first electrode 34A will attract the negatively charged anions 36B. Similarly, the negative charges 42B on the second electrode 34B attract the positively charged cations 36A. This attraction thus creates two electric double layers of charge 44A and 44B. Each layer of charge in the double layers 44A, 44B is generally separated by a small number of molecules of the solvent. Thus, the layers of charge in the double layers 44A, 44B are separated by very small distances. Each double layer 44A, 44B acts as a standard capacitor with parallel electrodes separated by a very small distance, which increases the capacitance for a given voltage across the electrodes. In addition to the effect of the reduced distance, the electrodes 34A, 34B of the electrical energy storage device 30 can be coated with a porous substance, such as activated carbon powder. This effectively increases the available surface area of the electrodes, allowing more positive charges 42A and negative charges 42B to be stored thereon, which also increases the capacitance of the electrical energy storage device 30 above that of a standard capacitor.

Figure 4A:
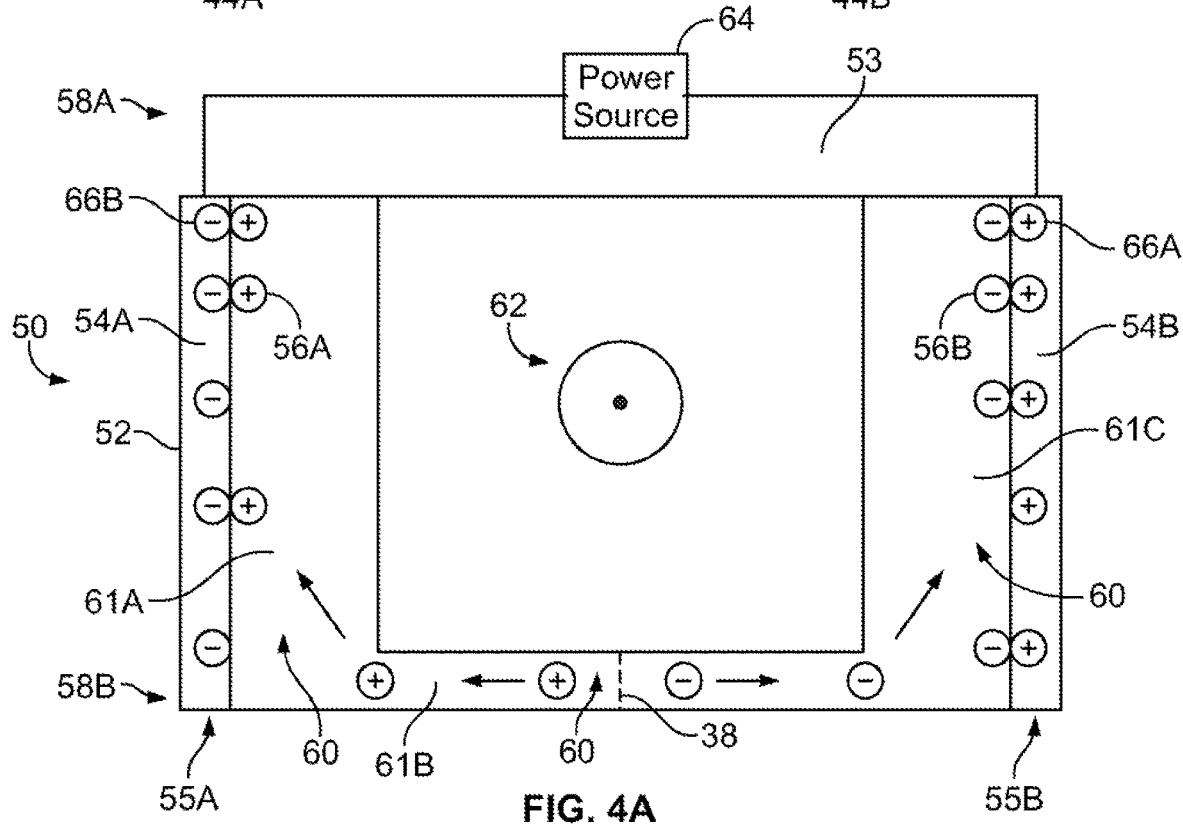
FIG. 4A is a cross-section of an implementation of an electrical energy storage device having a channel defined therein, according to aspects of the present disclosure.

Referring now to FIG. 4A, electrical energy storage device 50 is shown. Electrical energy storage device 50 is generally configured as an electric double layer capacitor, and thus has a housing 52 that includes a first end portion 58A, a second opposing end portion 58B, a first side portion 55A, and a second opposing side portion 55B. The electrical energy storage device 50 includes a first electrode 54A disposed in the housing adjacent to the first side portion 55A, a second electrode 54B disposed in the housing adjacent to the second opposing side portion 55B, and an electrolyte mixture containing a plurality of ions disposed in the housing 52 and generally between the first electrode 54A and the second electrode 54B. The electrolyte mixture generally contains cations 56A and anions 56B. Similar to electrical energy storage device 30, first electrode 54A and second electrode 54B are generally parallel to each other. However, electrical energy storage device 50 includes an ion-impermeable barrier 53 that reduces the available volume in the housing 52 through which the cations 56A and the anions 56B can travel. Barrier 53 can be an integral portion of the housing 52, or can be a separate component. As shown, barrier 53 is generally disposed between the first electrode 54A and the second electrode 54B and is adjacent to the first end portion 58A of the housing 52. The barrier 53 is configured to aid in preventing the cations 56A and the anions 56B from flowing between the first electrode 54A and the second electrode 54B adjacent to the first end portion 58A.

The housing 52 further includes a channel 60 that is defined generally between the first electrode 54A and the second electrode 54B, adjacent to the second end portion 58B. As shown, channel 60 is generally defined adjacent the second opposing end portion 58B of the housing 52, and spans the length of the housing 52 between first electrode 54A and the second electrode 54B. The channel 60 is configured to permit cations 56A and anions 56B to flow from a first portion 61A of the channel 60 generally adjacent to the first electrode 54A, through a second portion 61B of the channel 60 generally adjacent to the second end portion 58B of the housing 52, and to a third portion 61C of the channel 60 generally adjacent to the second electrode 54B. The channel 60 is also configured to permit the cations 56A and the anions 56B to flow in the opposite order as well. The channel 60 can be at least partially defined by the barrier 53. As shown in FIG. 4A, the ion permeable separator 60 can be disposed within the channel 60.

As shown in FIG. 4A, a magnetic field 62 can be applied to the electrical energy storage device 50 which imparts a force on the cations 56A and anions 56B. The direction of the magnetic field 62 can be into or out of the plane of the figure. In this manner, the magnetic field 62 is perpendicular to an axis connecting the first electrode 54A and the second electrode 54B. The magnetic field 62 is also perpendicular to an axis connecting the first end portion 58A of the housing 52 and the second end portion 58B of the housing 52. When the magnetic field 62 is applied, the magnetic field 62 imparts a force on the cations 56A and the anions 56B perpendicular to their velocity as they drift within the channel 60. As shown in FIG. 4A, the cations 56A, being positive charges, will experience a clockwise force when the direction of the magnetic field 62 is into the page. Anions 56B, being negative charges, will experience a counterclockwise force when the direction of the magnetic field 62 is into the page. Thus, the application of the magnetic field 62 into the page causes cations 56A within the channel 60 to flow towards the first electrode 54A. Similarly, anions 56B in the channel 60 are caused to flow towards the second electrode 54B.

As the cations 56A travel from the third portion 61C of and the second portion 61B towards the first electrode 54A, the force due to the magnetic field 62 causes the cations 56A to flow upwardly (in reference to the two-dimensional figure) along the first portion 61A of channel 60 toward the first end portion 58A of the housing 52. Similarly, as the anions 56B travel from the first portion 61A and the second portion 61B towards second electrode 54B, the force due to the magnetic field 62 causes the anions 56B to flow upwardly along the third portion 61C of the channel 60 toward the first end portion 58A of the housing 52.

As the cations 56A flow along first portion 61A of channel 60 towards the first end portion 58A, the force on the cations 56A due to the magnetic field 62 causes the cations 56A to move away from first electrode 54A towards second electrode 54B. Similarly, as the anions 56B flow along third portion 61C of channel 60 towards the first end portion 58A, the force on the anions 56B due to the magnetic field 62 causes the anions 56B to move away from second electrode 54B towards first electrode 54A. As this movement occurs, the ion-impermeable barrier 53 prevents the cations 56A from traveling towards the second electrode 54B adjacent to the first end portion 58A of the housing 52, and prevents the anions 56B from traveling towards the first electrode 54A adjacent to the first end portion 58A of the housing 52. Thus, the barrier 53 prevents the cations 56A and the anions 56B from looping back around in a complete circle, which they would otherwise do under the influence of the applied magnetic field 62. The presence of the barrier 53 instead causes cations 56A to accumulate near electrode 56A, and causes anions 56B to accumulate near electrode 56B.

Thus, the channel 60 generally allows the cations 56A and the anions 56B to flow between the first electrode 54A and the second electrode 54B adjacent to the second end portion 58B of the housing 52. Similarly, the barrier 53 generally aids in preventing the cations 56A and the anions 56B from flowing between the first electrode 54A and the second electrode 54B adjacent to the first end portion 58A of the housing 52. The channel 60 can thus have a generally U-shaped cross-section, a generally V-shaped cross-section, or any other suitable cross-section that allows the ions to flow between the first electrode 54A and the second electrode 54B adjacent the second end portion 58B of the housing 52, and to flow adjacent the first electrode 54A and the second electrode 54B between the first end portion 58A and the second end portion 58B. Similarly, the barrier 53 can have any suitable shape that prevents ions from flowing between the first electrode 54A and the second electrode 54B adjacent the first end portion 58A of the housing 52, and forms the channel 60 that allows ions to flow between the first electrode 43A and the second electrode 54B adjacent the second end portion 58B of the housing 52.

Similar to electrical energy storage device 30 in FIG. 3, the application of electrical power from power source 64 causes positive charge 66A to build up on the second electrode 54B, and negative charge 66B to build up on the first electrode 54A. The positive charge 66A attracts the anions 56B in the electrolyte mixture, while the negative charge 66B attracts the cations 56A in the electrolyte mixture. Thus, the applied electrical power from the power source 64, and the application of the magnetic field 62 as shown in FIG. 4A, together cause anions 56B to move toward second electrode 54B and cations 56A to move toward the first electrode 54A. The application of the magnetic field 62 while applying electrical power from the power source 64 therefore causes more ions to be directed to the electrodes, and for the ions to be moved more directly towards the electrodes. The electric double layers that are created in electrical energy storage device 50 by the application of electrical power from power source 64 are thus larger and formed more quickly as compared to electrical energy storage device 30 having only electrical power from power source 64 applied.

The corresponding increase in the capacitance and decrease of associated time-constant of the electrical energy storage device 50 can be observed in at least three different ways. Generally, when charging the electrical energy storage device 50 by application of electrical power alone, the power source 64 applies an amount of input electrical power to the electrical energy storage device 50 for a certain time period, which causes a corresponding amount of electrical energy to be stored in the electrical energy storage device 50. By simultaneously applying the magnetic field 62 as discussed above, the enhanced characteristics can be observed. A first method is applying the input electrical power from power source 64 for the same time period, such that a greater amount of electrical energy is drawn from the power source 64 and stored in the electrical energy storage device 50. A second method is applying the input electrical power from power source 64 for a shorter time period, such that an equivalent amount of energy is drawn from power source 64 and stored in the electrical energy storage device 50. A third method is applying input electrical power from power source 64 for a time period such that the total energy stored in the electrical energy storage device 50 is greater than the maximum total energy that can be stored in the electrical energy storage device 50 when the magnetic field 62 is not simultaneously applied. Thus, the presence of the magnetic field increases the capacitance of the electrical energy storage device 50 and decreases the time constant of the electrical energy storage device 50, thus enhancing the charging of the electrical energy storage device 50.

Figure 4B:
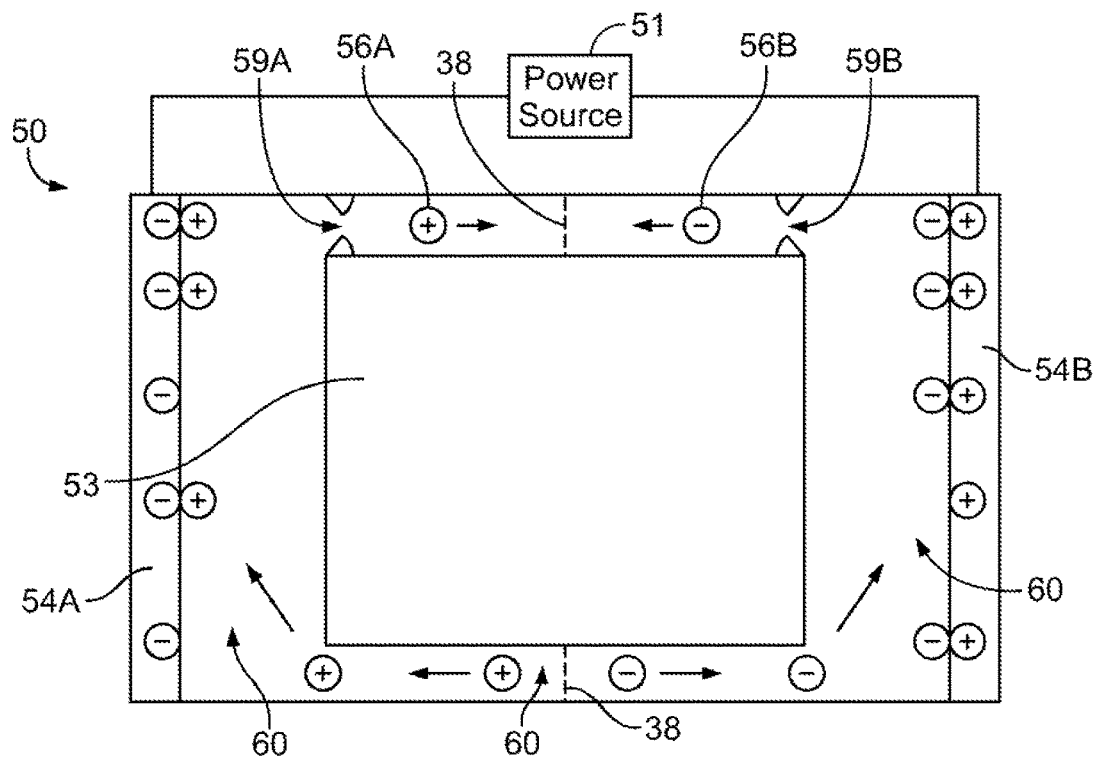
FIG. 4B is a cross-section of another implementation of an electrical energy storage device having a channel defined therein, according to aspects of the present disclosure.

Referring now to FIG. 4B, an alternate implementation of electrical energy storage device 50 coupled to power source 51 is shown. In this alternate implementation, barrier 53 can include gates 59A and 59B that are configured to be selectively opened and closed. The opening of gates 59A and 59B thus permit at least a portion of the cations 56A and the anions 56B to flow through the barrier generally adjacent the first end portion 58A. This allows the cations 56A and the anions 56B to be able to flow away from the first electrode 54A and the second electrode 54B, and can be used to avoid overcharging the electrical energy storage device 50. Other configurations of the barrier 53 are contemplated, such as a barrier 53 that is able to move relative to the housing 52 to allow cations 56A and anions 56B to flow between the housing 52 and the barrier 53. In another configuration, barrier 53 is composed of a material that selectively ion-permeable, such that in one state the barrier 53 blocks the flow of ions, and in another state the barrier 53 allows ions to flow through the barrier 53.

Figure 5A:
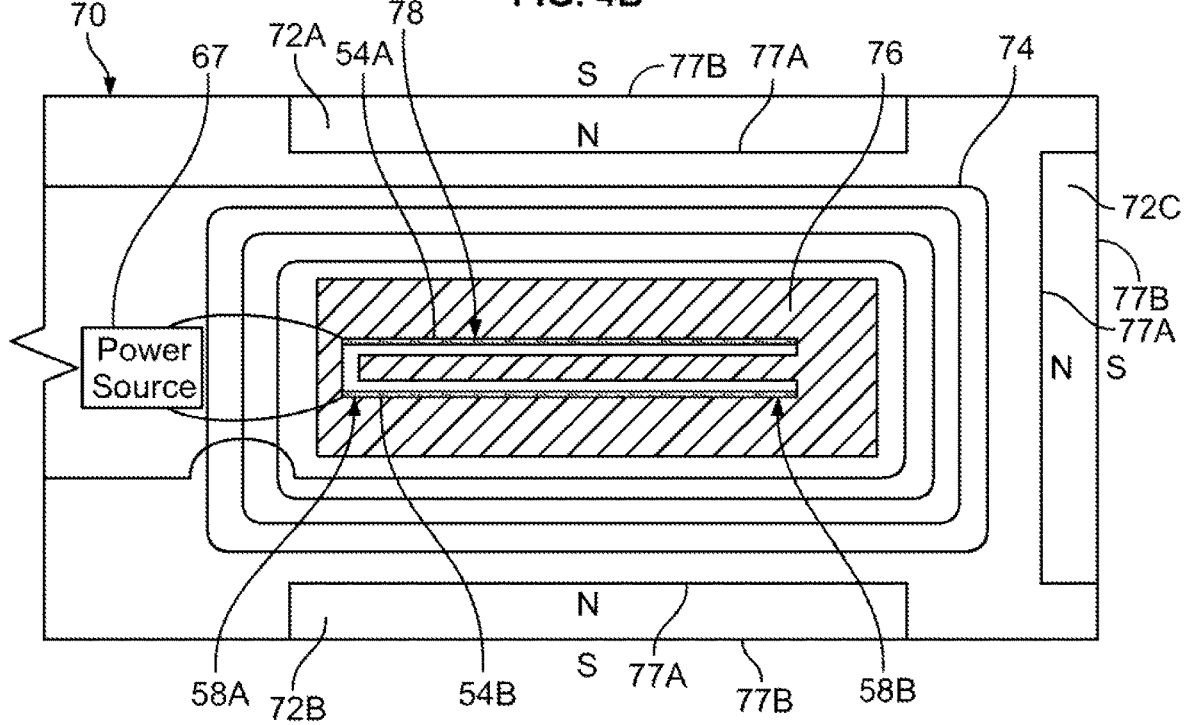
FIG. 5A is a cross-section of an implementation of the electrical energy storage devices of FIG. 4A or FIG. 4B integrated with an electromagnetic machine, according to aspects of the present disclosure.

Referring now to FIG. 5A, a cross-section of a rotating electromagnetic machine with an integrated electrical energy storage device is shown. The electromagnetic machine in FIG. 5A can be the rotating electromagnetic machines of FIG. 1A, 1B, or 2, or any other suitable rotating electromagnetic machine. In another implementation, the rotating electromagnetic machine has one, two, four, five, or any suitable number of magnets. In yet another implementation, the electrical energy storage device is integrated with a linear electromagnetic machine having any suitable number of magnets. The rotating electromagnetic machine in FIG. 5A can include a magnet housing 70 having magnets 72A, 72B, and 72C. Magnet housing 70 can be the combination of outer magnet assembly 4A and inner magnet assembly 4B of rotating electromagnetic machine 2 of FIG. 1A. Magnet housing 70 can also be housing 20 of rotating electromagnetic machine 16 of FIG. 2. A coil assembly including coil 74 and a core 76 can be disposed such that the magnets 72A, 72B, and 72C generally surround the coil 74 and the core 76. The core 76 can be composed of a stack of laminate plates. In some implementations, the magnets 72A, 72B, 72C can be configured to rotate (and are thus part of the rotor) while the coil 74 and core 76 remain stationary (and are thus part of the stator). In other implementations, the coil 74 and core 76 rotate (and are thus part of the rotor), while the magnets 72A, 72B, 72C remain stationary (and are thus part of the stator).

An electrical energy storage device 78 is generally disposed within the electromagnetic machine. In the implementation of FIG. 5A, the electrical energy storage device is generally positioned adjacent to or as part of the core 76 such that it is positioned within the coil 74. In this configuration, the electrical energy storage device 78 is surrounded by the coil 74 and the magnets 72A, 72B, and 72C. The electrical energy storage device 78 can be one of the electrical energy storage devices shown in FIGS. 4A and 4B, and thus will have a first electrode, a second electrode, a first end, and a second end. In the implementation of FIG. 5A, electrical energy storage device 78 is connected to power source 67. Power source 67 can be the electromagnetic machine itself, or can be an independent power source separate from the electromagnetic machine. In a further implementation, electrical energy storage device 78 is not connected to a power source. The electrical energy storage device can be configured to rotate or move linearly during operation of the machine of FIG. 5A, if the coil 74 and the core 76 are part of the rotor. The electrical energy storage device can also be configured to remain stationary during operation of the machine of FIG. 5A, if the coil 74 and the core 76 are part of the stator.

As is shown, each of the magnets 72A, 72B, and 72C is a dipole magnet having a north pole 77A and a south pole 77B on opposite sides of the magnets. Each magnet 72A, 72B, and 72C has the same pole of the magnet facing the coil 74. As shown in the implementation of FIG. 5A, the north pole 77A of each magnet 72A, 72B, and 72C faces the coil 74. In other implementations, the south pole 77B each magnet 72A, 72B, and 72C can face the coil 74.

During the operation of the rotating electromagnetic machine of FIG. 5A, either (i) the magnets 72A, 72B, and 72C will rotate relative to the coil assembly and the electrical energy storage device 78, or (ii) the coil assembly and the electrical energy storage device 78 will rotate relative to the magnets 72A, 72B, 72C. As the magnets rotate, the magnetic field produced by the magnets will cross through the center of the coil 74. As is shown in FIG. 5A, electrical energy storage device 78 is positioned such that this magnetic field produced by magnets 72A, 72B, and 72C is perpendicular to both an axis connecting the first electrode 54A and the second electrode 54B, and an axis connecting the first end portion 58A and the second end 58B of the electrical energy storage device 78. Thus, the rotation of magnets 72A, 72B, and 72C will cause a magnetic field to be applied through the electrical energy storage device 78 that is into or out of the page. The rotating electromagnetic machine of FIG. 5A could also operate with one, two, four, or five magnets, as long as the field applied by the magnetics is directed towards the electrical energy storage device 78 in the same manner as described with respect to FIG. 5A. As discussed above, the application of this magnetic field enhances the charging of the electrical energy storage device 78. Generally, when the power source 67 is applied to the electrical energy storage device 78, the polarity of the power source 67 is chosen such that both the power source to the electrical energy storage device 78 and the applied magnetic field move the cations towards one of the electrodes, and both move the anions towards the other electrode.

Figure 5B:
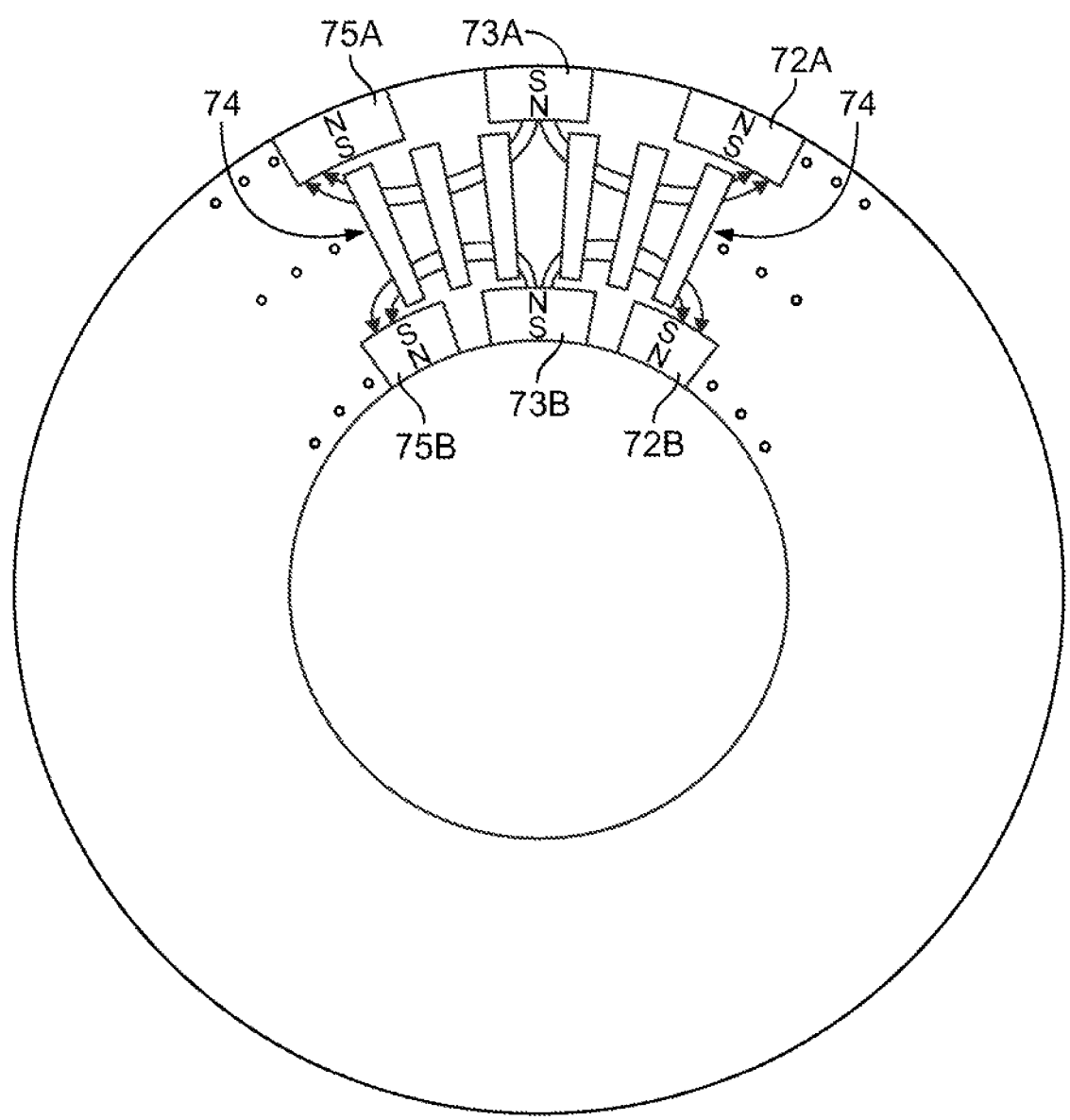
FIG. 5B is a cross-section of the electromagnetic machine of FIG. 5A, according to aspects of the present disclosure.

Referring now to FIG. 5B, a cross-section of an implementation of the rotating electromagnetic machine of FIG. 5A is shown. This rotating electromagnetic machine has a first magnet set including magnet 72A and magnet 72B; a second magnet set including magnet 73A and magnet 73B; and a third magnet set including magnet 75A and magnet 75B. As shown in the cross-section, the poles facing the coil 74 alternate for each magnet set. Magnets 71A and 71B have the south pole of each magnet facing the coil 74. Magnets 73A and 73B have the north pole of each magnet facing the coil 74. Magnets 75A and 75B have the south pole of each magnet facing the coil 74. As can be seen in FIG. 5B, the additional magnet sets help to direct the magnetic fields produced by the magnets perpendicularly through the center of the coil 74 and core 76 in the correct direction so as to enhance the charging of electrical energy storage device disposed within the coil 74. Generally, a rotating electromagnetic machine utilized according to aspects of the present disclosure will include a plurality of coils evenly spaced around an outer circumference of the inner circle shown in FIG. 5B. Similar, the rotating electromagnetic machine will include a plurality of magnet sets evenly spaced around an inner circumference of the outer circle shown in FIG. 5B, such that any one coil 74 with electrical energy storage device disposed therein is constantly subject to a magnetic field applied perpendicular through the center of the coil 74.

The rotating electromagnetic machine of FIGS. 5A and 5B in conjunction with electrical energy storage device 78 can be used to enhance the charging of the electrical energy storage device. To accomplish this, the electrical energy storage device 78, which is physically disposed adjacent the magnets 72A, 72B, and 72C, is electrically coupled to an independent power source. The independent power source then applies electrical power to the electrical energy storage device 78. The magnetic field produced by magnets 72A, 72B, 72C passes through the electrical energy storage device 78, which enhances the charging of the electrical energy storage device 78. This enhancement can occur whether the electromagnetic machine is rotating or not. As discussed above with respect to FIG. 4A, this enhancement can occur in the form of storing more energy by applying input power for the same time period, storing the same amount of energy by applying input power for a shorter time period, or by applying input power for a time period such that the amount of energy stored is greater than the maximum total energy that can be stored in the electrical energy storage device 78 when it is not physically disposed adjacent to the magnets 72A, 72B, and 72C.

In another implementation, the power source that is electrically coupled to the electrical energy storage device 78 is the rotating electromagnetic machine itself. Electrical energy produced by the rotating electromagnetic machine can be stored in electrical energy storage device 78. The rotation and/or arrangement of the rotating electromagnetic machine again enhances the charging of the electrical energy storage device 78, even though the rotating electromagnetic machine is acting as the power source. By capturing this energy, the dynamic range of the rotating electromagnetic machine is effectively increased.

In yet another implementation, the electrical energy storage device is not electrically coupled to any power source. As the rotating electromagnetic machine rotates and the magnetic field is applied to the electrical energy storage device 78, the cations and anions in the electrolyte mixture are forced by the magnetic field to form a layer on the corresponding electrodes. This layer of ions adjacent to the electrode surface induces a corresponding layer of charge to form in the electrode itself, to thus form the electrical double layers on each of the electrodes. In this manner, the electrical energy storage device is effectively "pre-charged" by the rotation and/or arrangement of the electromagnetic machine.

Moreover, if the magnets 72A, 72B, 72C are positioned appropriately, no rotation of the electromagnetic machine is required. If charge had been previously accumulated at the electrodes while the machine was in motion, the charge will remain held in place by the magnetic field after the machine has come to a stop.

In still another implementation, the electrical energy storage device 78 can be disposed external to the coil 74, the coil 76, and the magnets 72A, 72B, 72C. In this implementation, the electrical energy storage device 78 could disposed within an exterior housing of the machine (which can be magnet housing 70), and will thus be positioned within the machine. The electrical energy storage device 78 could also be disposed outside of the exterior housing of the machine, and will thus be positioned adjacent to the machine. If the electrical energy storage device 78 is positioned outside of the exterior housing of the machine and thus positioned adjacent to the machine, the exterior housing of the machine must not block magnetic fields from reaching the electrical energy storage device 78. Irrespective of whether the electrical energy storage device 78 is positioned within or adjacent to the electromagnetic machine, the electrical energy storage device 78 is oriented such that any magnetic fields interacting with the electrical energy storage device 78 will be perpendicular to both an axis connecting the first electrode 54A and the second electrode 54B, and an axis connecting the first end portion 58A and the second end 58B of the electrical energy storage device 78, as in FIG. 4A and FIG. 5A.

Figure 6:
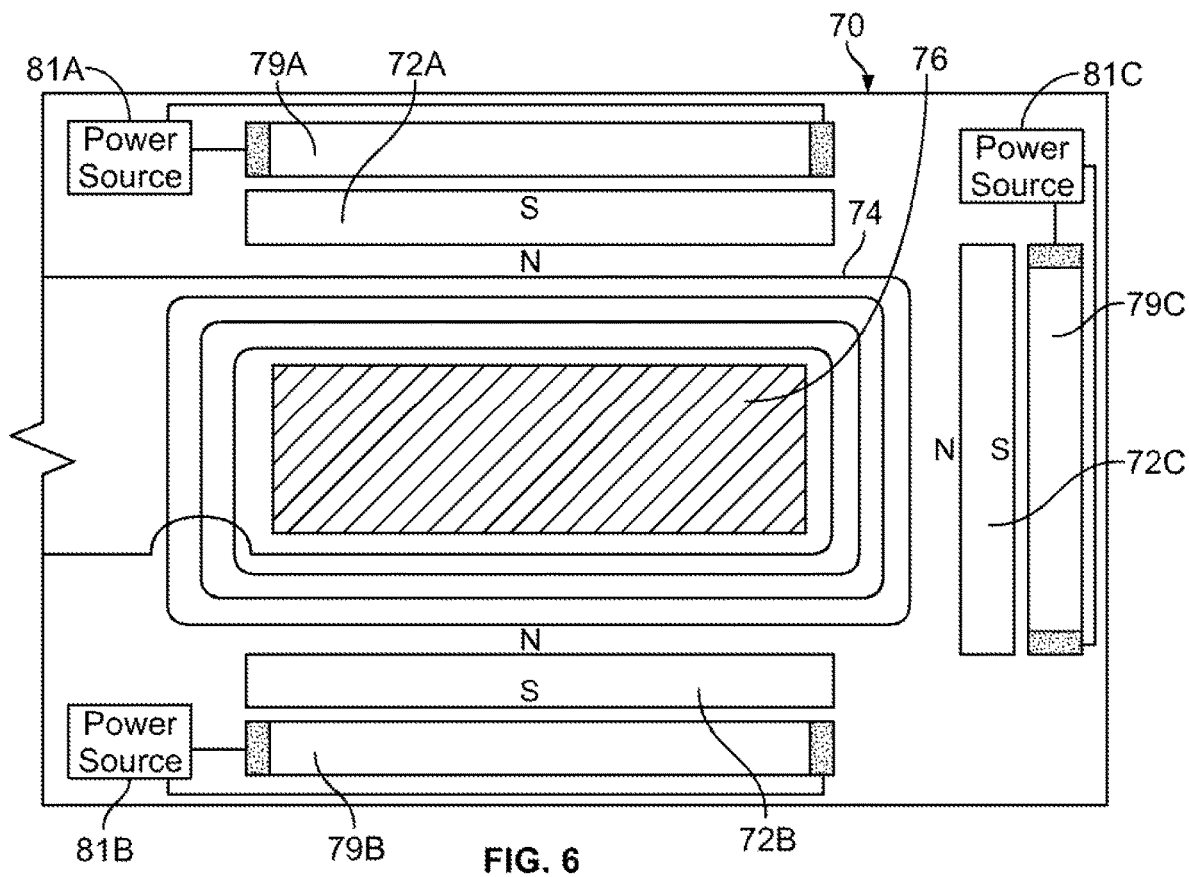
FIG. 6 is a cross-section of another implementation of the electrical energy storage devices of FIG. 4A or FIG. 4B integrated with an electromagnetic machine, according to aspects of the present disclosure.

Referring now to FIG. 6, a cross-section of an alternative implementation of a rotating or linear electromagnetic machine that operates in conjunction with the electrical energy storage device of FIGS. 4A and 4B is shown. The electromagnetic machine in FIG. 6 can be the rotating electromagnetic machines of FIG. 1A, 1B, or 2, or any other suitable rotating electromagnetic machine. In another implementation, the rotating electromagnetic machine has one, two, four, five, or any suitable number of magnets. In yet another implementation, the electrical energy storage device is integrated with a linear electromagnetic machine having any suitable number of magnets. Either the magnets or the coil assemblies of the electromagnetic machine of FIG. 6 can be the rotor or the stator.

In this implementation, electrical energy storage devices 79A, 79B, and 79C are positioned within the electromagnetic machine. However, rather than being positioned within the coil 74, the electrical energy storage devices 79A, 79B, and 79C are each positioned outside of the coil, the core 76, and magnets 72A, 72B, and 72C. In this configuration, the electrical energy storage devices 79A, 79B, and 79C are adjacent to corresponding magnets 72A, 72B, and 72C such that magnets 72A, 72B, and 72C are disposed between (i) the electrical energy storage devices 79A, 79B, 79C and (ii) the coil 74 and the core 76. The electrical energy storage devices 79A, 79B, and 79C can generally be disposed outside of the coil 74, the core 76, and magnets 72A, 72B, and 72C but within an exterior housing of the electromagnetic machine of FIG. 6 such that the electrical energy storage devices 79A, 79B, and 79C disposed within the electromagnetic machine.

In another implementation, the electrical energy storage devices 79A, 79B, and 79C are positioned in essentially the same configuration, except that the electrical energy storage devices 79A, 79B, and 79C are positioned outside and adjacent to the electromagnetic machine, instead of within the electromagnetic machine. When the electrical energy storage devices 79A, 79B, and 79C are disposed outside of the exterior housing of the electromagnetic machine and thus adjacent to the electromagnetic machine, the exterior housing must generally not block the magnetic field from the magnets 72A, 72B, and 72C from reaching the electrical energy storage devices 79A, 79B, and 79C.

In either implementation, the magnetic field produced by magnets 72A, 72B, and 72C is directed orthogonal to the surface of the magnets, and is thus directed towards the electrical energy storage devices 79A, 79B, and 79C. Each of the electrical energy storage devices 79A, 79B, and 79C are oriented such that the magnetic field from the corresponding magnets is perpendicular to an axis between the electrodes and to an axis between the first end and the second end of the electrical energy storage device 79A, 79B, and 79C. The magnetic field thus imparts a force on the cations and the anions perpendicular to their velocity in each of the electrical energy storage device 79A, 79B, and 79C, as discussed above. In the implementation of FIG. 6, no rotation or translation of the machine is required to increase the capacitance or the charging rate of the electrical energy storage devices 79A, 79B, and 79C. These benefits will have a "residual" effect if the machine is in motion and then comes to a stop. The rotating electromagnetic machine of FIG. 6 could also operate with one, two, four, or five magnets, as long as the field applied by the magnetics is directed towards the electrical energy storage devices in the same manner as described with respect to FIG. 6.

In the implementation of FIG. 6, electrical energy storage devices 79A, 79B, and 79C are connected to power sources 81A, 81B, and 81C. Power sources 81A, 81B, and 81C can be the electromagnetic machine itself, or can be independent power sources separate from the electromagnetic machine. In a further implementation, electrical energy storage devices 79A, 79B, and 79C are not connected to a power source. Generally, when the power sources 81A, 81B, and 81C are applied to the electrical energy storage devices 79A, 79B, and 79C, the polarity of the power sources 81A, 81B, and 81C is chosen such that both the power applied to the electrical energy storage devices 79A, 79B, and 79C and the applied magnetic field move the cations towards one of the electrodes, and both move the anions towards the other electrode.

The electrical energy storage devices 79A, 79B, 79C can be configured to rotate or move linearly during operation of the machine of FIG. 6, if the magnets 72A, 72B, 72C are part of the rotor. The electrical energy storage devices 79A, 79B, 79C can also be configured to remain stationary during operation of the machine of FIG. 5A, if the magnets 72A, 72B, 72C are part of the stator.

Figure 7:
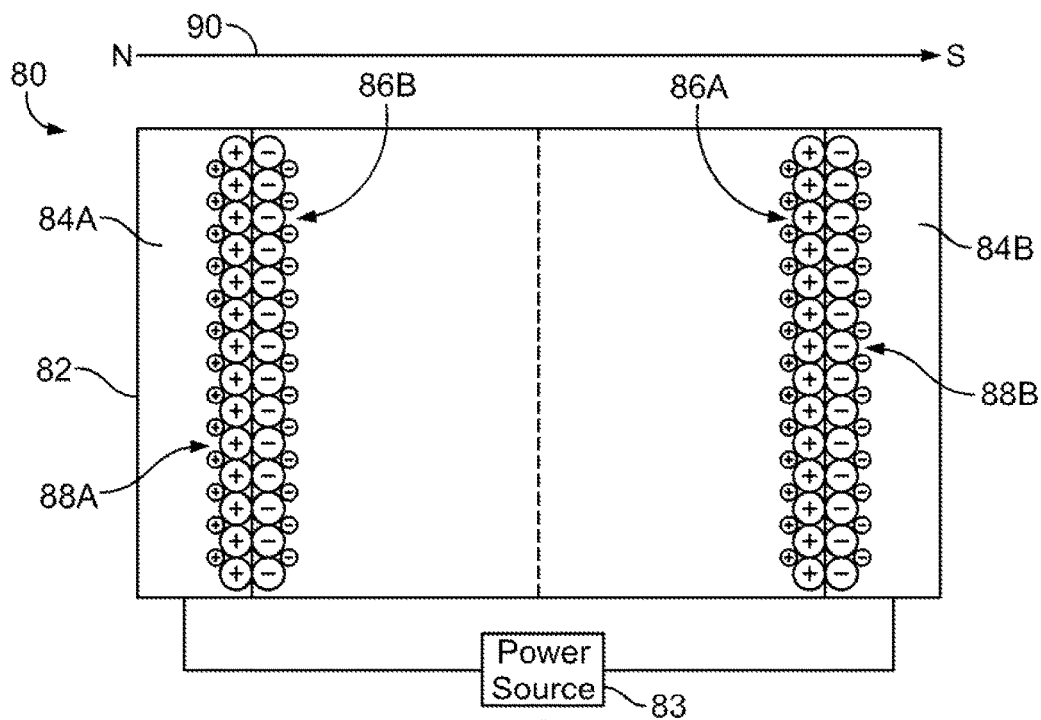
FIG. 7 is a cross-section of an implementation of an electrical energy storage device having magnetic ions disposed therein, according to aspects of the present disclosure.

Referring now to FIG. 7, an electrical energy storage device 80 connected to power source 83 that utilizes magnetic ions is shown. Electrical energy storage device 80 includes a housing 82, a first electrode 84A, and a second electrode 84B. First electrode 84A and second electrode 84B are generally parallel to each other and disposed on opposite sides of the housing 82. Disposed in the housing 82 is an electrolyte mixture that contains a cations 86A and anions 86B in a solvent. As discussed above, applying electrical power to the electrical energy storage device 80 via a power source causes the cations 86A to be attracted to negative charges 88B on second electrode 84B and anions 86B to be attracted to positive charges 88A on first electrode 84A. In the implementation of FIG. 7, either the cations 86A or the anions 86B comprise a magnetic material. The magnetic cations 86A or the magnetic anions 86B can include diamagnetic ions, paramagnetic ions, ferromagnetic ions, antiferromagnetic ions, ferrimagnetic ions, or any combination thereof. By applying a magnetic field 90 parallel to an axis connecting first electrode 84A and second electrode 84B, a force is imparted on only the magnetic ions. The polarity of the power source, the direction of the magnetic field 90, and species of ion that is magnetic are all chosen to ensure that the magnetic field 90 imparts a force in the direction that the ions will already be attracted to by the buildup of charges on the corresponding electrode. In the illustrated implementation of FIG. 7, the cations 86A are chosen to be magnetic. The cations 86A already experience an electrical attraction toward the second electrode 84B, and thus the magnetic field 90 is chosen such that the magnetic field 90 imparts a force on the cations 86A that is also directed to the second electrode 84B. Thus, the application of the magnetic field 90 causes more of the magnetic ions to form at the double layers, thus increasing the capacitance of electrical energy storage device 80. Similar to the implementation of the electrical energy storage device in FIG. 4A and 4B, the charging of the electrical energy storage device is therefore enhanced.

Figure 8:
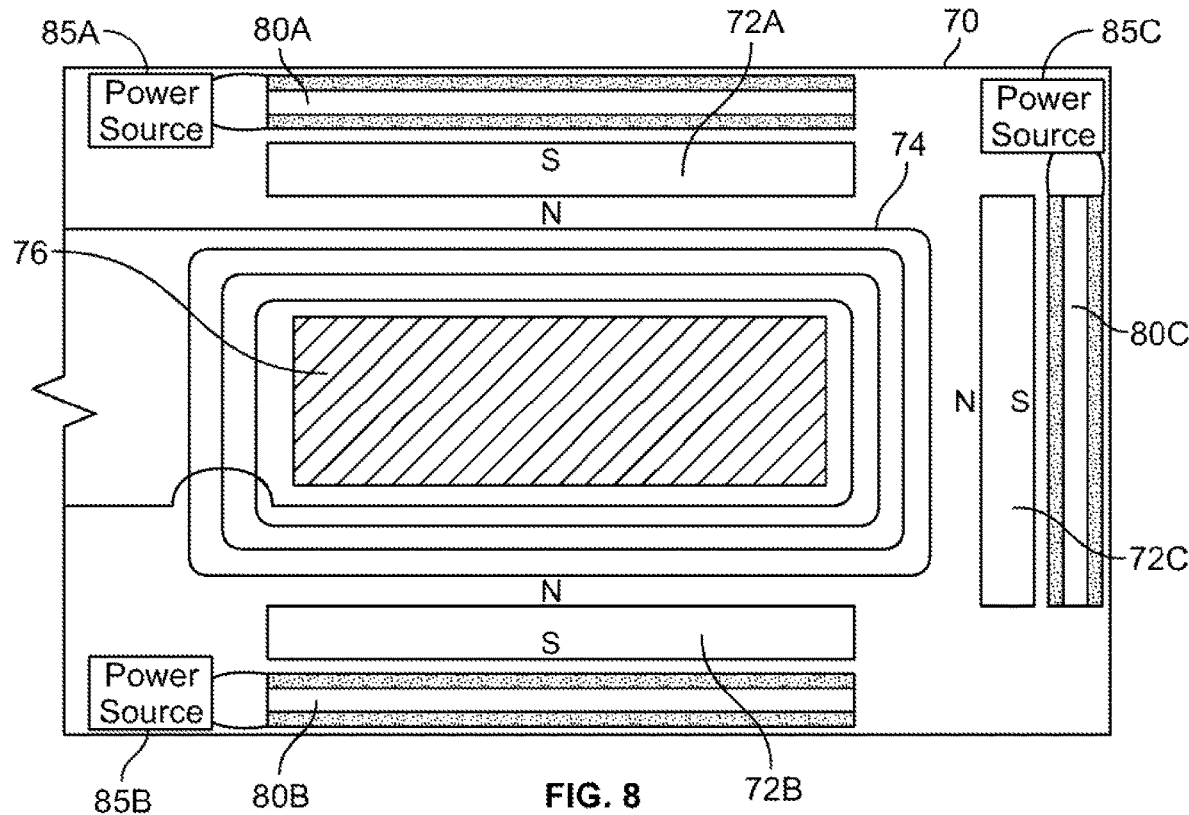
FIG. 8 is a cross-section of an implementation of the electrical energy storage device of FIG. 7 integrated with an electromagnetic machine, according to aspects of the present disclosure.

Referring now to FIG. 8, a cross-section of a rotating or linear electromagnetic machine utilizing the electrical energy storage device 80 of FIG. 7 is shown. The electromagnetic machine in FIG. 8 can be the rotating electromagnetic machines of FIG. 1A, 1B, or 2, or any other suitable rotating electromagnetic machine. In another implementation, the rotating electromagnetic machine has one, two, four, five, or any suitable number of magnets. In yet another implementation, the electrical energy storage device is integrated with a linear electromagnetic machine having any suitable number of magnets. Either the magnets or the coil assemblies of the electromagnetic machine of FIG. 8 can be the rotor or the stator. Thus, the electromagnetic machine generally includes a magnet housing 70 that contains magnets 72A, 72B, and 72C. The electromagnetic machine of FIG. 8 has three electrical energy storage devices 80A, 80B, and 80C that are each disposed adjacent a respective magnet 72A, 72B, 72C. The electrical energy storage devices are oriented such that one electrode of each electrical energy storage device is nearer to the respective magnet than the other electrode of each electrical energy storage device. The magnetic field produced by magnets 72A, 72B, and 72C is thus parallel to an axis between the first electrode and the second electrode of each of the electrical energy storage devices 80A, 80B, and 80C. As discussed above, the application of this magnetic field imparts a force on the magnetic ions in the electrolyte mixture of each of the electrical energy storage devices, thus increasing the capacitance and decreases the time constant of each of the electrical energy storage devices.

The electrical energy storage device of FIG. 7 and the electromagnetic machine of FIG. 8 can be used in a similar manner as described above with respect to the electromagnetic machine of FIGS. 5A and 5B. The electrical energy storage devices can be electrically coupled to an independent power source. When the magnetic field is applied to the electrical energy storage devices, the charging thereof by the independent power source is enhanced. In another implementation, the electrical energy storage devices can be electrically coupled to the electromagnetic machine such that the electromagnetic machine acts as the power source for the electrical energy storage devices. Relative motion of the electromagnetic machine causes the electrical energy storage devices to begin to charge up, which is enhanced by the magnetic field being applied by the magnets. In yet another implementation, the electrical energy storage devices are not electrically coupled to a power source. As the magnetic field is applied to the electrical energy storage devices, the cations and anions in the electrolyte mixture are forced by the magnetic field to form a layer on the corresponding electrodes. This layer of ions adjacent to the electrode surface induces a corresponding layer of charge to form in the electrode itself, to thus form the electrical double layers on each of the electrodes. In this manner, the electrical energy storage device is effectively "pre-charged" by the application of the magnetic field, and if charge had been previously accumulated at the electrodes while the machine was in motion, it will remain held in place by the magnetic field after the machine has come to a stop. The rotating electromagnetic machine of FIG. 8 could also operate with one, two, four, or five magnets, as long as the field applied by the magnetics is directed towards the electrical energy storage devices in the same manner as described with respect to FIG. 8.

In the implementation of FIG. 8, electrical energy storage devices 80A, 80B, and 80C are connected to power sources 85A, 85B, and 85C. Power sources 85A, 85B, and 85C can be the electromagnetic machine itself, or can be independent power sources separate from the electromagnetic machine. In a further implementation, electrical energy storage devices 80A, 80B, and 80C are not connected to a power source. Generally, when the power sources 85A, 85B, and 85C are applied to the electrical energy storage devices 80A, 80B, and 80C, the polarity of the power sources 85A, 85B, and 85C is chosen such that both the power applied to the electrical energy storage devices 80A, 80B, and 80C and the applied magnetic field move the cations towards one of the electrodes, and both move the anions towards the other electrode.

The electrical energy storage devices 80A, 80B, 80C can be configured to rotate or move linearly during operation of the machine of FIG. 8, if the magnets 72A, 72B, 72C are part of the rotor. The electrical energy storage devices 79A, 79B, 79C can also be configured to remain stationary during operation of the machine of FIG. 5A, if the magnets 72A, 72B, 72C are part of the stator.

Figure 9:
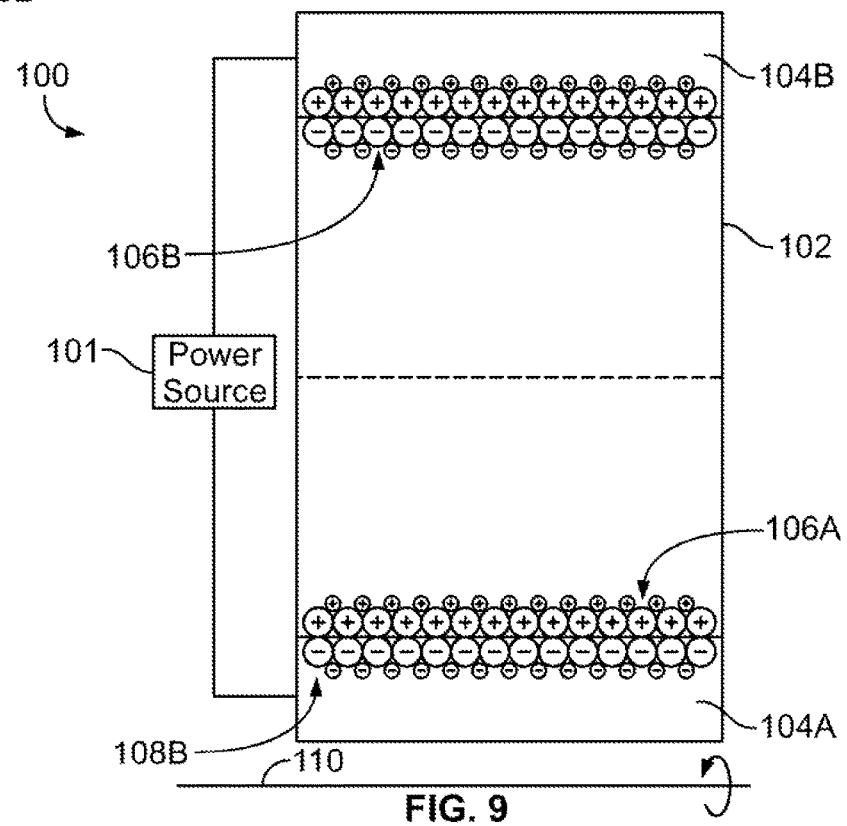
FIG. 9 is a cross-section of an implementation of an electrical energy storage device having one species of ion with a greater density than the other species of ion, according to aspects of the present disclosure.

Referring now to FIG. 9, an electrical energy storage device 100 connected to power source 101 that utilizes density differences of the ions in the electrolyte mixture is shown. Electrical energy storage device 100 includes a housing 102, a first electrode 104A, and a second electrode 104B. First electrode 104A and second electrode 104B are generally parallel to each other and disposed on opposite sides of the housing 102. Disposed in the housing 102 is an electrolyte mixture that contains cations 106A and anions 106B in a solvent. As discussed above, applying electrical power to the electrical energy storage device 100 causes the cations 106A to be attracted to negative charges 108B on the first electrode 104A, and causes the anions 106B to be attracted to positive charges 108A on the second electrode 104B.

In the implementation of FIG. 9, one of the species of ions has a higher density than the other species. The cations 106A could be denser than the anions 106B, or vice-versa. In order to increase the capacitance of the electrical energy storage device 100, the electrical energy storage device 100 is rotated along an axis of rotation 110. The axis of rotation 110 is generally perpendicular to an axis between the first electrode 104A and the second electrode 104B and is offset from the electrical energy storage device 100 such that the axis of rotation does not pass between the electrodes. As the axis of rotation 110 is offset from the center of electrical energy storage device 100, the cations 106A and the anions 106B separate via a process known as density gradient centrifugation. As the electrical energy storage device 100 rotates, the higher density ions are forced further away from the axis of rotation 110 than the lower density ions. The rotation of the electrical energy storage device thus causes the higher density ions to accumulate on the electrode of the electrical energy storage device furthest away from the axis of rotation 110. The polarity of the power source, the location of the axis of rotation, and the species of ion that is to be the denser ion are all selected such that both the normal operation of the electrical energy storage device 100 and the rotation of the electrical energy storage device 100 impart a force on the denser ion in the same direction. Similarly, the less dense ions are chosen such that the attraction between the less dense ions and the charges built up on the electrode nearest the axis of rotation 110 overcome the force from the rotation itself.

Thus, in the illustrated implementation of FIG. 9, the polarity of the power source 112 is selected such that positive charges 108A build up on second electrode 104B. These positive charges 108A attract the negatively charged anions 106B in the electrolyte mixture. The anions 106B are also selected so as to have a higher density than the positively charged cations 106A, and the axis of rotation 110 is placed at the opposite end of the electrical energy storage device 100 from the second electrode 104B. Thus, the rotation of electrical energy storage device 100 about axis of rotation 110 causes the higher-density anions 106B to experience a greater force away from the axis of rotation 110 than the lower-density cations 106A. The rotation of the electrical energy storage device 100 thus works in concert with the application of power from power source 112 to force the anions 106B towards the second electrode 104B. The cations 106A are selected such that the electric force they experience towards the first electrode 104A due to the buildup of negative charges 108B is greater than the opposing force due to the rotation of electrical energy storage device 100 about axis of rotation 110. In example implementations, the density of the higher density ion may be two times, four times, six times, or eight times the density of the lower density ion. Other implementations are contemplated where the ratio between the density of the higher density ion and the lower density ion are different.

Figure 10A:
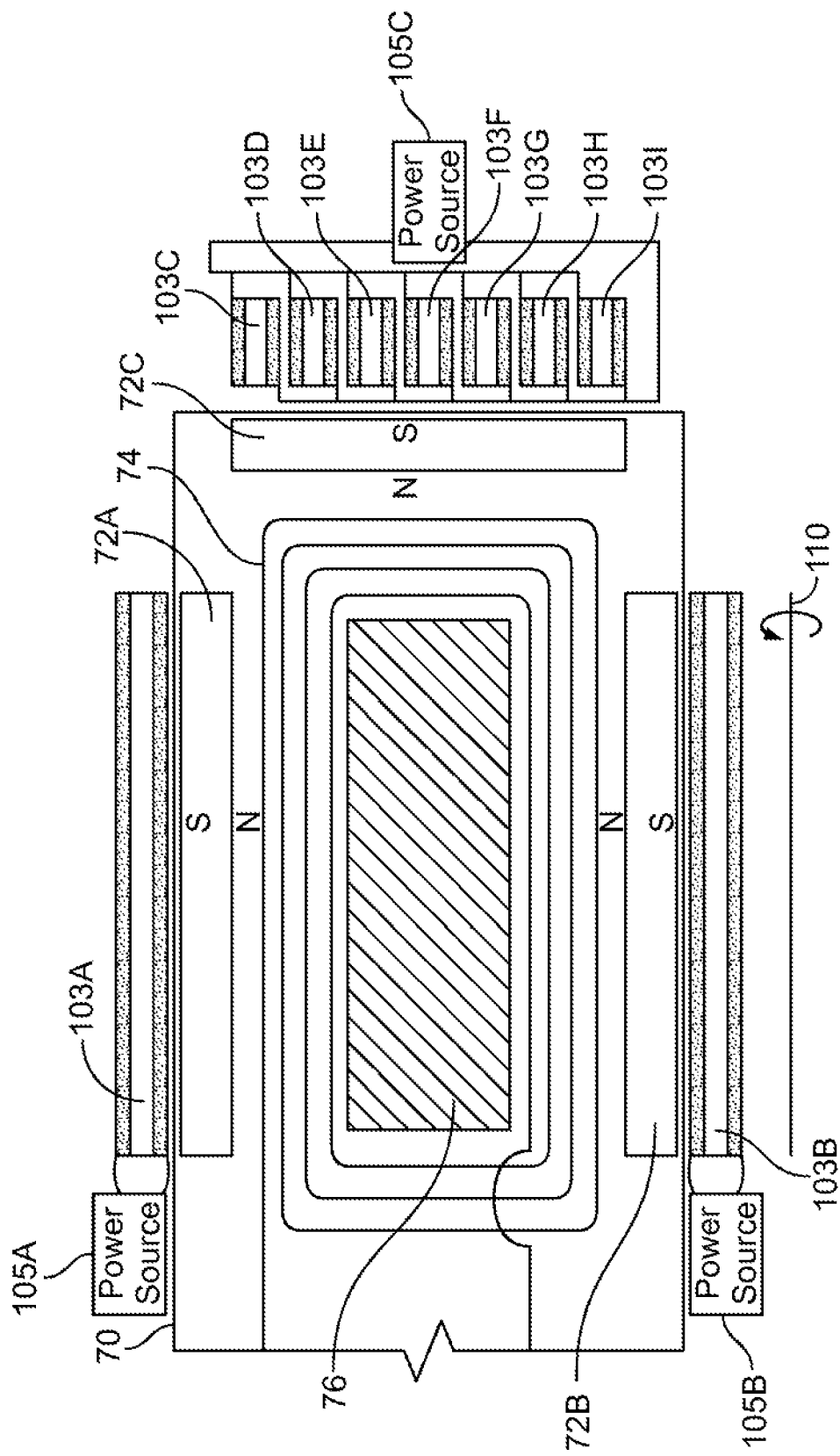
FIG. 10A is a cross-section of an implementation of the electrical energy storage device of FIG. 9 integrated with an electromagnetic machine, according to aspects of the present disclosure.

Referring now to FIG. 10A, a cross-section of a rotating electromagnetic machine utilizing the electrical energy storage device 100 of FIG. 9 is shown. The electromagnetic machine in FIG. 10A can be the rotating electromagnetic machines of FIG. 1A, 1B, or 2, or any other suitable rotating electromagnetic machine. In another implementation, the rotating electromagnetic machine has one, two, four, five, or any suitable number of magnets. The electromagnetic machine of FIG. 10A can also be a linear electromagnetic machine.

As shown, the rotating electromagnetic machine generally has a magnet housing 70 that contains magnets 72A, 72B, and 72C. Similar to the rotating electromagnetic machine of FIG. 8, the rotating electromagnetic machine of FIG. 10A has electrical energy storage devices 103A, 103B, and 103C-103I disposed adjacent respective magnets 72A, 72B, and 72C. In this implementation, the electrical energy storage devices 103A-103I are disposed outside of the magnet housing 70 so as to shield the electrical energy storage devices from unneeded magnetic fields. The electrical energy storage devices 103A-103I are oriented such that an axis between the first electrode and the second electrode of each electrical energy storage device is generally perpendicular an axis of rotation 110 of the rotating electromagnetic machine. As such, electrical energy storage devices 103A and 103B are generally oriented the same as electrical energy storage devices 80A and 80B of the rotating electromagnetic machine of FIG. 8.

However, electrical energy storage devices 103C-103I in FIG. 10A are rotated 90° as compared to electrical energy storage device 80C in FIG. 8. As it can be beneficial to save space, the rotating electromagnetic machine of FIG. 10A can utilize multiple shorter rotated electrical energy storage devices 103C-103I that are electrically connected in parallel to form an effective electrical energy storage device that can be equivalent to electrical energy storage devices 103A and 103B. Reducing the size of the electrical energy storage devices provides a smaller surface area on which charge can collect, thus reducing the capacitance. However, by providing multiple shorter electrical energy storage devices and electrically coupling them in parallel, this reduction is minimized or erased. As the rotating electromagnetic machine rotates about the axis of rotation 110, the electrical energy storage devices 103A-103I rotate. As this happens, the ions within the electrolyte mixture of each of the electrical energy storage devices with the greater density experiences a greater force toward the electrode furthest from the axis of rotation 110 than the ion with the smaller density, thus increasing the capacitance and decreasing the time constant of each of the electrical energy storage devices.

The rotating electromagnetic machine of FIG. 10A could also operate with one, two, four, five, or any suitable number of magnets. Moreover, electrical energy storage devices 103A-103I are suitable for use in any rotating machines, even rotating machines that do not possess magnets.

In the implementation of FIG. 10A, electrical energy storage device 103A is connected to power source 105A, electrical energy storage device 103B is connected to power source 105B, and electrical energy storage devices 103A-103I are connected to power source 105C. Power sources 105A, 105B, and 105C can be the electromagnetic machine itself, or can be independent power sources separate from the electromagnetic machine. In a further implementation, electrical energy storage devices 103A-103I are not connected to a power source. Generally, when the power sources 105A, 105B, and 105C are applied to the electrical energy storage devices 103A-103I, the polarity of the power sources 105A, 105B, and 105C is chosen such that both the power applied to the electrical energy storage devices 103A-103I and the rotation of the electromagnetic machine move the cations towards one of the electrodes, and both move the anions towards the other electrode.

The electrical energy storage device of FIG. 9 and the rotating electromagnetic machine of FIG. 10A can be used in a similar manner as described above with respect to the rotating electromagnetic machine of FIGS. 5A and 5B, or the rotating electromagnetic machine of FIG. 8. The electrical energy storage devices can be electrically coupled to an independent power source. When the rotating electromagnetic machine rotates the electrical energy storage devices, the charging thereof by the independent power source is enhanced. In another implementation, the electrical energy storage devices can be electrically coupled to the rotating electromagnetic machine such that the rotating electromagnetic machine acts as the power source for the electrical energy storage devices. Rotation of the rotating electromagnetic machine directly produces electric power, at least a portion of which can be used to directly charge the electrical energy storage device. This charging is enhanced by the rotation of the electrical energy storage devices.

In yet another implementation, the electrical energy storage devices are not electrically coupled to a power source. As the electrical energy storage devices are caused to rotate by the rotating electromagnetic machine, the cations and anions in the electrolyte mixture are forced by the rotation of the rotating electromagnetic machine (via density gradient centrifugation) to form a layer on the corresponding electrodes. This layer of ions adjacent to the electrode surface induces a corresponding layer of charge to form in the electrode itself, to thus form the electrical double layers on each of the electrodes. In this manner, the electrical energy storage device is effectively "pre-charged" by the application of the magnetic field.

Because it is rotation that enhances the functionality of the electrical energy storage devices 103A-103I and not the application of a magnetic field, the electrical energy storage devices 103A-103I must generally be coupled to the rotor of the electromagnetic machine. In FIG. 10A, the magnets 72A, 72B, 72C are part of the rotor, and thus the electrical energy storage devices 103A-103I are coupled to the magnets or the magnet housing 70. While FIG. 10A shows the electrical energy storage devices 103A-103I being coupled or otherwise disposed exterior to the magnet housing 70, the electrical energy storage devices 103A-103I could also be coupled or otherwise disposed within the magnet housing 70 and still be configured to rotate along with the magnets.

Figure 10B:
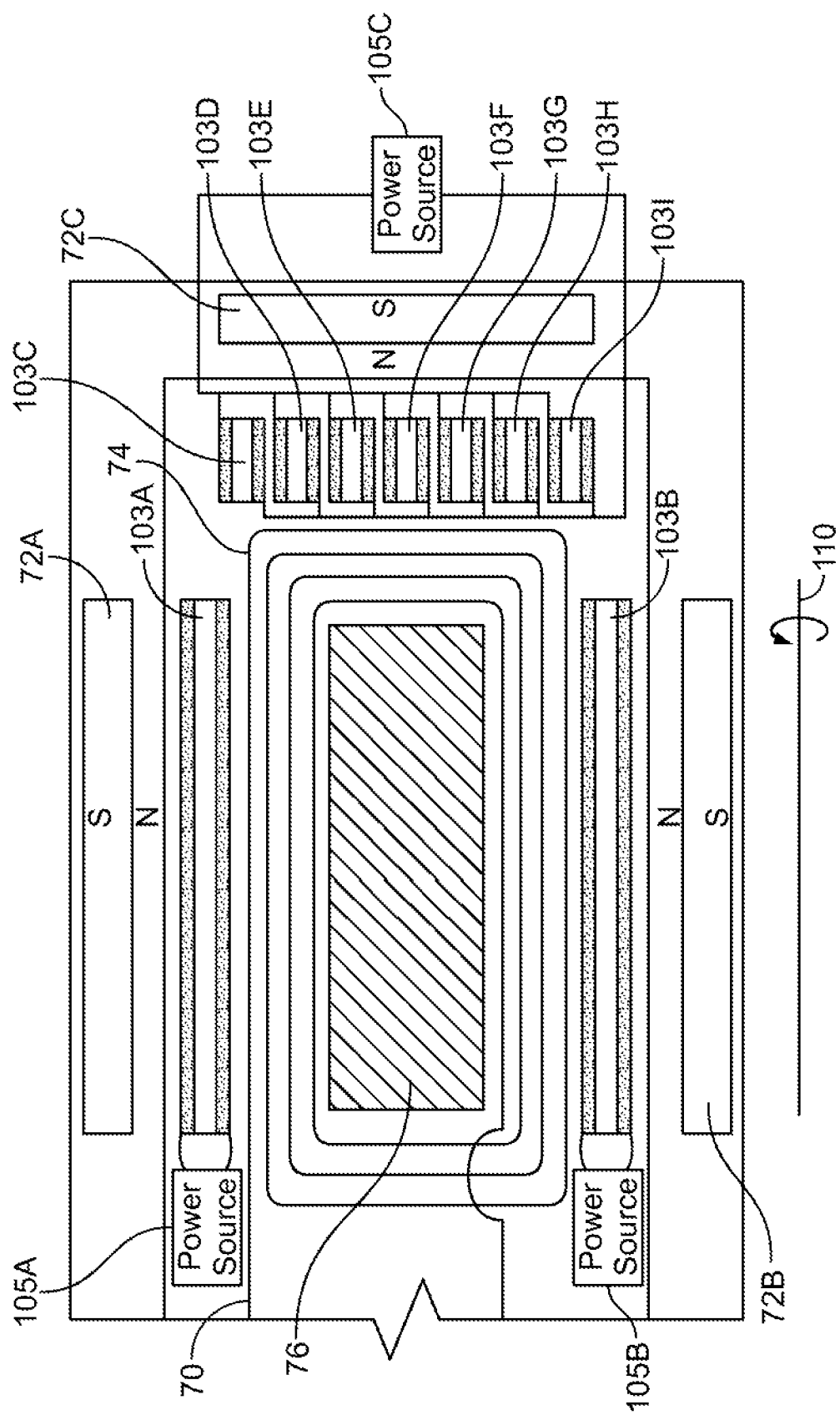
FIG. 10B is a cross-section of another implementation of the electrical energy storage device of FIG. 9 integrated with an electromagnetic machine, according to aspects of the present disclosure.

FIG. 10B illustrates an electromagnetic machine similar to that of FIG. 10A, except that the coil 74 and the core 76 are designed to rotate and are thus part of the rotor of the machine. The magnets 72A, 72B, 72C are configured to be stationary during operation, and are thus part of the stator. Because it is the coil 74 and the core 76 that rotate during operation, the electrical energy storage devices 103A-103I are generally disposed within or coupled to a housing containing the coil 74 and the core 76. Other than the positioning of the electrical energy storage devices 103A-103I, the machine of FIG. 10B operates similarly to the machine of FIG. 10A. The electrical energy storage devices 103A-103I are oriented such that an axis between the first electrode and the second electrode of each electrical energy storage device is generally perpendicular an axis of rotation 110 of the rotating electromagnetic machine.

Different implementations of the electrical energy storage devices can be combined to enhance the charging of the electrical energy storage devices. For example, the electrical energy storage device with the barrier and channel can be used in conjunction with ions where one species of ions is magnetic, where one species of ions has a greater density, or both. Similarly, electrical energy storage devices without the barrier and channel can utilize ions where one species of ions is magnetic and where one species of ions has a greater density than the others.

As discussed herein, a variety of different electromagnetic machines can be used with the various types of electrical energy storage devices. The electromagnetic machine can be a rotating electromagnetic machine, a linear electromagnetic machine, or any other type of electromagnetic machine. In some implementations, the machine could even be a non-electromagnetic machine. In some implementations, electromagnetic machines allowing for movement (e.g. rotational movement or linear translational movement) of both some or all of the magnets and some or all of the coil assemblies may be used. The machine can have any suitable number of magnet sets, and each magnet set can have any suitable number of magnets. The machine can also have any suitable number of coils and cores. Thus, while the cross-sectional images described herein generally only show a single magnet set and a single coil/core combination, the electromagnetic machines generally have multiple magnet sets and multiple coil/core combination disposed circumferentially about an axis of rotation (for a rotating electromagnetic machine) or linearly about an axis of translation (for a linear electromagnetic machine). Moreover, each coil may have its own separate core, or two or more of the coils may share a common core. The electromagnetic machines could also just have a single magnet set with a single coil/core combination.

Thus, for ease of understanding in the specification and claims, the electromagnetic machine may be described as having "a magnet," "a magnet set," "a core," "a coil," "an electrical energy storage device," "an axle," "a coil assembly," etc. However, it is understood that the article "a" accompanying any of these components or other components does not restrict any of the implementations described or claimed to only a single component, but rather covers implementations having one or more of the component.

While the present disclosure has been described with reference to one or more particular implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations according to aspects of the present disclosure may combine any number of features from any of the implementations described herein.

What is claimed is:

1. A method of charging an electrical energy storage device, the method comprising:
    positioning the electrical energy storage device adjacent to or within an electromagnetic machine, the electromagnetic machine including at least one set of magnets and at least one coil assembly;
    causing the electromagnetic machine to rotate such that (i) the at least one set of magnets is rotated relative to the at least one coil assembly, (ii) the at least one coil assembly is rotated relative to the at least one set of magnets, or (iii) both (i) and (ii); and
    responsive to the rotation of the at least one set of magnets or of the at least one coil assembly, generating electrical energy within the electrical energy storage device.

2. The method of claim 1, wherein a power source is electrically coupled to the electrical energy storage device.

3. The method of claim 2, wherein the power source is configured to apply input power to the electrical energy storage device.

4. The method of claim 3, wherein, while the electromagnetic machine is stationary, applying input power to the electrical energy storage device for a first time period causes a first amount of stored electrical energy to be stored in the electrical energy storage device.

5. The method of claim 4, wherein responsive to the rotation of the at least one set of magnets or of the at least one coil assembly, applying input power to the electrical energy storage device for the first time period causes a second amount of stored electrical energy to be stored in the electrical energy storage device, the second amount of stored electrical energy being greater than the first amount of stored electrical energy.

6. The method of claim 4, wherein responsive to the rotation of the at least one set of magnets or of the at least one coil assembly, the first amount of stored electrical energy is stored in the electrical energy storage device by applying input power to the electrical energy storage device during a second time period, the second time period being less than the first time period.

7. The method of claim 4, wherein responsive to the rotation of the at least one set of magnets or of the at least one coil assembly, a first maximum amount of electrical energy is stored in the electrical energy storage device, and wherein a second maximum amount of electrical energy is stored in the electrical energy storage device when the electromagnetic machine is stationary, the first maximum amount of electrical energy being greater than the second maximum amount of electrical energy.

8. The method of claim 4, wherein the rotating electromagnetic machine is the power source.

9. The method of claim 8, wherein the electrical energy stored in the electrical energy storage device is a portion of a total amount of electrical energy produced by the rotating electromagnetic machine.

10. The method of claim 2, wherein the power source is independent from the rotating electromagnetic machine.

11. The method of claim 1, wherein the rotation of the at least one set of magnets or of the at least one coil assembly causes electrical energy to be stored on the electrical energy storage device while the electrical energy storage device is not electrically connected to a power source.

12. The method of claim 1, wherein the rotation of the at least one set of magnets or of the at least one coil assembly generates a magnetic field.

13. The method of claim 12, wherein the generated magnetic field causes the electrical energy to be generated within the electrical energy storage device.

14. The method of claim 1, wherein the rotation of the at least one set of magnets or of the at least one coil assembly causes rotation of the electrical energy storage device, and wherein the rotation of the electrical energy storage device causes electrical energy to be generated within the electrical energy storage device.

15. The method of claim 1, wherein the electrical energy storage device includes a housing and an electrolyte mixture disposed in the housing, the electrolyte mixture containing a plurality of ions.

16. The method of claim 15, wherein the plurality of ions includes (i) a first type of ion having a first density and a second type of ion having a second density that is less than the first density, (ii) magnetic ions and non-magnetic ions, or (iii) both (i) and (ii).

17. The method of claim 15, wherein the electrical energy storage device further includes a first electrode, a second electrode, and a barrier disposed in the housing between the first electrode and the second electrode, the barrier being configured to aid in preventing the plurality of ions from flowing between the first electrode and the second electrode adjacent to a first end of the housing.

18. The method of claim 17, wherein the barrier includes one or more gates configured to be selectively opened and closed, and wherein when the one or more gates are open, the barrier is configured to aid in permitting the plurality of ions to flow between the first electrode and the second electrode adjacent to the first end of the housing.

19. A method of charging an electrical energy storage device, the method comprising:
applying a magnetic field to the electrical energy storage device; and
responsive to the applying the magnetic field to the electrical energy storage device, storing an amount of electrical energy in the electrical energy storage device,
wherein a power source is electrically coupled to the electrical energy storage device and is configured to apply input power to the electrical energy storage device, and
wherein applying input power to the electrical energy storage device for a first time period while the magnetic field is not applied to the electrical energy storage device causes a first amount of stored electrical energy to be stored in the electrical energy storage device.

20. The method of claim 19, wherein responsive to the applying of the magnetic field to the electrical energy storage device, applying input power to the electrical energy storage device for the first time period causes a second amount of stored electrical energy to be stored in the electrical energy storage device, the second amount of stored electrical energy being greater than the first amount of stored electrical energy.

21. The method of claim 19, wherein responsive to the applying the magnetic field to the electrical energy storage device, the first amount of stored electrical energy is stored in the electrical energy storage device by applying input power to the electrical energy storage device during a second time period, the second time period being less than the first time period.

22. The method of claim 19, wherein responsive to the applying the magnetic field to the electrical energy storage device, a first maximum amount of electrical energy is stored in the electrical energy storage device, and wherein a second maximum amount of electrical energy is stored in the electrical energy storage device when the magnetic field is not applied, the first maximum amount of electrical energy being greater than the second maximum amount of electrical energy.

23. A method of charging an electrical energy storage device, the method comprising:
applying a magnetic field to the electrical energy storage device; and
responsive to the applying the magnetic field to the electrical energy storage device, storing an amount of electrical energy in the electrical energy storage device,
wherein the applying the magnetic field to the electrical energy storage device causes electrical energy to be stored in the electrical energy storage device while the electrical energy storage device is not electrically connected to a power source.

24. A method of charging an electrical energy storage device, the method comprising:
applying a magnetic field to the electrical energy storage device, the electrical energy storage device being positioned within or adjacent to an electromagnetic machine; and
responsive to the applying the magnetic field to the electrical energy storage device, storing an amount of electrical energy in the electrical energy storage device.

25. The method of claim 24, wherein the magnetic field is applied to the electrical energy storage device during rotation of the electromagnetic machine.

26. The method of claim 25, wherein the electrical energy storage device includes a housing and an electrolyte mixture disposed in the housing, the electrolyte mixture containing a plurality of ions that includes a first type of ion having a first density and a second type of ion having a second density that is less than the first density.

27. A method of charging an electrical energy storage device, the method comprising:
applying a magnetic field to the electrical energy storage device; and responsive to the applying the magnetic field to the electrical energy storage device, storing an amount of electrical energy in the electrical energy storage device,
wherein the electrical energy storage device includes a housing, an electrolyte mixture containing a plurality of ions disposed in the housing, a first electrode, a second electrode, and a barrier disposed in the housing between the first electrode and the second electrode, the barrier being configured to aid in preventing the plurality of ions from flowing between the first electrode and the second electrode adjacent to a first end of the housing.

28. The method of claim 27, wherein the barrier includes one or more gates configured to be selectively opened and closed, and wherein when the one or more gates are open, the barrier is configured to aid in permitting the plurality of ions to flow between the first electrode and the second electrode adjacent to the first end of the housing.

\* \* \* \* \*